(12) United States Patent
Yokoyama et al.

(10) Patent No.: US 7,163,232 B2
(45) Date of Patent: Jan. 16, 2007

(54) CURTAIN AIRBAG AND ITS FOLDING METHOD AND SYSTEM

(75) Inventors: Aki Yokoyama, Shizuoka (JP);
Kazuyuki Inomata, Shizuoka (JP);
Norihito Mochizuki, Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 7 days.

(21) Appl. No.: 10/303,046

(22) Filed: Nov. 25, 2002

(65) Prior Publication Data
US 2003/0116947 A1    Jun. 26, 2003

(30) Foreign Application Priority Data
Nov. 26, 2001 (JP) .............................. 2001-359739
Dec. 10, 2001 (JP) .............................. 2001-376064
Mar. 7, 2002 (JP) .............................. 2002-062478

(51) Int. Cl.
*B60R 21/16* (2006.01)
(52) U.S. Cl. .................. 280/730.2; 280/743.1
(58) Field of Classification Search ............ 280/730.2, 280/743.1
See application file for complete search history.

(56) References Cited

U.S. PATENT DOCUMENTS 5,938,233 A * 8/1999 Specht ............... 280/730.2
6,149,185 A * 11/2000 White et al. ............. 280/728.2
6,196,585 B1 * 3/2001 Igawa ..................... 280/743.1
6,336,651 B1 * 1/2002 Mramor et al. .......... 280/728.2
6,361,068 B1   3/2002 Stein et al.
6,371,512 B1   4/2002 Asano et al.

FOREIGN PATENT DOCUMENTS

| EP | 0 980 796 A2 | 2/2000 |
| EP | 0 992 404 A2 | 4/2000 |
| GB | 2 311 043 A | 9/1997 |
| JP | 10-310322 A | 11/1998 |
| WO | WO 99/20492 A1 | 4/1999 |

OTHER PUBLICATIONS

"Air Bag Fold and Method", Research Disclosure, Kenneth Mason Publications, XP000991870, Sep. 2000, pp. 1590-1592.

* cited by examiner

*Primary Examiner*—Ruth Ilan
(74) *Attorney, Agent, or Firm*—Foley & Lardner LLP

(57) ABSTRACT

An airbag is provided which is folded with a duct part and an expansion part, the duct part having an inlet for allowing fluid communication throughout the duct part, the expansion part communicating with the duct part, wherein the airbag comprises an aggregative part obtained by aggregating a downward portion of the airbag, and a plurality of arms obtained by folding an upward portion of the airbag and being in fluid communication along the length direction of the airbag. The arms cover the aggregative part on the back thereof with respect to the expansion direction of the airbag. Thus, even having greater length from one end to another end, the airbag can deploy smoothly with less time difference between the front and the back in the length direction.

11 Claims, 35 Drawing Sheets

CURTAIN AIRBAG AND ITS FOLDING METHOD AND SYSTEM

BACKGROUND OF THE INVENTION

The present invention relates generally to an automotive airbag and a folding method and system thereof. More particularly, the present invention relates to a so-called curtain airbag which deploys along the side windows of the vehicle upon collision, and a folding method and system thereof.

In the field of airbags which expand and deploy by introduction of gas, the so-called curtain airbag is known which deploys along the side windows of the vehicle upon collision. Ordinarily, the curtain airbag is folded in narrow shape and disposed along a roof side rail of the vehicle. And when the vehicle undergoes an impact from the side, the airbag has gas introduced therein to expand and deploy downward along the windows.

U.S. Pat. No. U.S. 6,371,512 B1 discloses an automotive curtain airbag folded in narrow shape and disposed along a roof side rail of the vehicle, wherein the airbag is constructed flat on the side of the roof side rail, and is folded like a bellows on the side of a head lining or a seat occupant. As being folded in narrow shape and disposed along the roof side rail of the vehicle, the curtain airbag is required to allow smooth introduction of gas from one end to another end and deploy stably along the windows. Moreover, the curtain airbag is larger in longitudinal dimension or length than the airbag provided to the steering wheel, so that its fully manual folding raises a problem of taking much work time.

PCT Application WO 99/20492 discloses a system for automatically folding a curtain airbag, which comprises two rolls each provided with a plurality of ridges protruding circumferentially. The rolls are combined to have the ridges engaged with each other for rotation. Then, an unfolded airbag is fed to a space between the rolls along the length direction, obtaining the airbag folded like a bellows (fanfold airbag).

The structure of feeding an airbag to a space between the rolls may be suitable for folding of an airbag at a predetermined small depth and like a bellows, which, however, often provides tension to a cloth along the width direction during folding. Thus, folding work is not always easy when folding an airbag in deep undulations or in undulations having shallow and deep portions. Specifically, during folding, an airbag as extended flat is narrowed in the width direction or in the height direction upon deployment, providing tension to the cloth along the height direction. Then, if a portion with one undulation is folded deeply, a shallow portion adjacent to the deeply folded portion also undergoes great tension.

When arranging in the airbag an inner pipe or gas lance which serves as a passage for receiving gas first and guiding it to other parts, it is important for deployment of the airbag in a desired state to stably fold a portion with inner pipe in a predetermined shape. However, the inner pipe is disposed in the length direction of the airbag and along one end in the width direction thereof, so that even if the portion with inner pipe is restrained for positioning, the airbag is deformed by being pulled to the center in the width direction in the folding process, leading to difficult achievement of desired constant folded undulations. Folding the airbag in a desired shape needs an enhancement in strength of the airbag or complicated control means for restraining tension to be applied to the airbag, for example. Then, if the reinforcement of a cloth or the use of a cloth of greater weight is carried out to enhance the strength of the airbag, it becomes difficult to fold the airbag in a small size, which creates a undesirableness for a curtain airbag to which small-size folding capability is demanded. On the other hand, the control means for restraining tension to be applied to the airbag brings complication of the device, resulting in difficult restraint of manufacturing cost. Particularly, a cloth which allows compact accommodation lacks flexibility, and thus tends to cause hard positioning in the folding process, requiring highly developed means, raising a problem of difficult restraint of manufacturing cost.

SUMMARY OF THE INVENTION

It is, therefore, an object of the present invention to provide an automotive airbag which deploys smoothly upon vehicle collision. Another object of the present invention is to provide a folding method and system which allow easy folding of such airbag in a predetermined shape.

The present invention provides generally an airbag which is folded with a duct part and an expansion part, the duct part having an inlet for allowing fluid communication throughout the duct part, the expansion part communicating with the duct part, wherein the airbag comprises: an aggregative part, the aggregative part being obtained by aggregating a downward portion of the airbag; and a plurality of arms, the arms being obtained by folding an upward portion of the airbag, the arms being in fluid communication along a length direction of the airbag, the arms covering the aggregative part on a back thereof along an expansion direction of the airbag.

According to the present invention, when gas or fluid is introduced into the airbag, gas is supplied from one end of the airbag to another end along the duct part, which is then supplied to the aggregative part, achieving expansion and deployment of the airbag in its entirety. The arms are arranged in fluid communication along the length direction of the airbag, securing the gas communication even in the folded state. Thus, the airbag, even having greater length from one end to another end, can deploy smoothly with less time difference between the front and the back in the length direction.

BRIEF DESCRIPTION OF THE DRAWINGS

The other objects and the features of the present invention become apparent from the following description with reference to the accompanying drawings, wherein.

Figure 3:
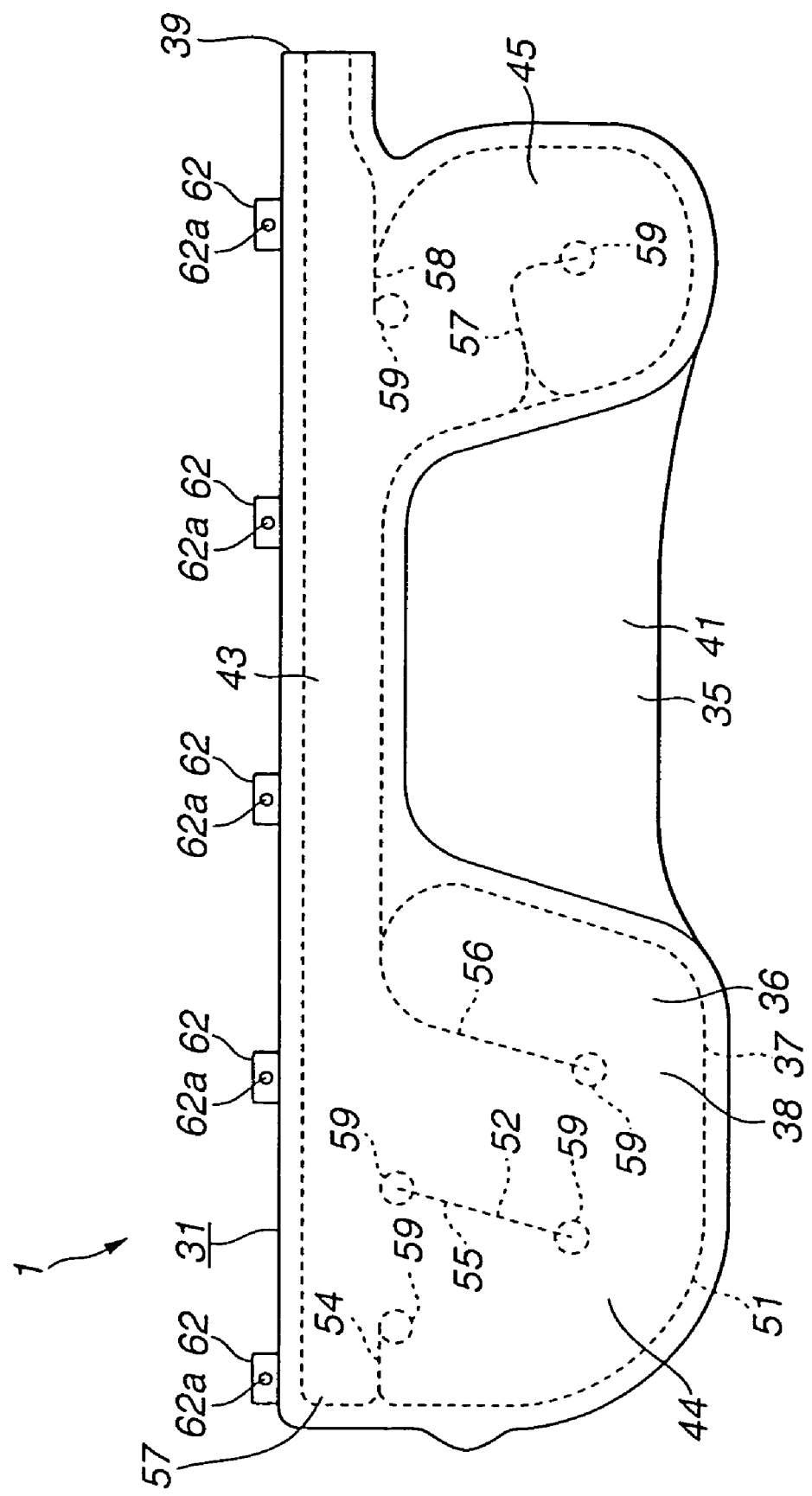
FIG. 3 is a side view showing the airbag as spread.
Figure 4:
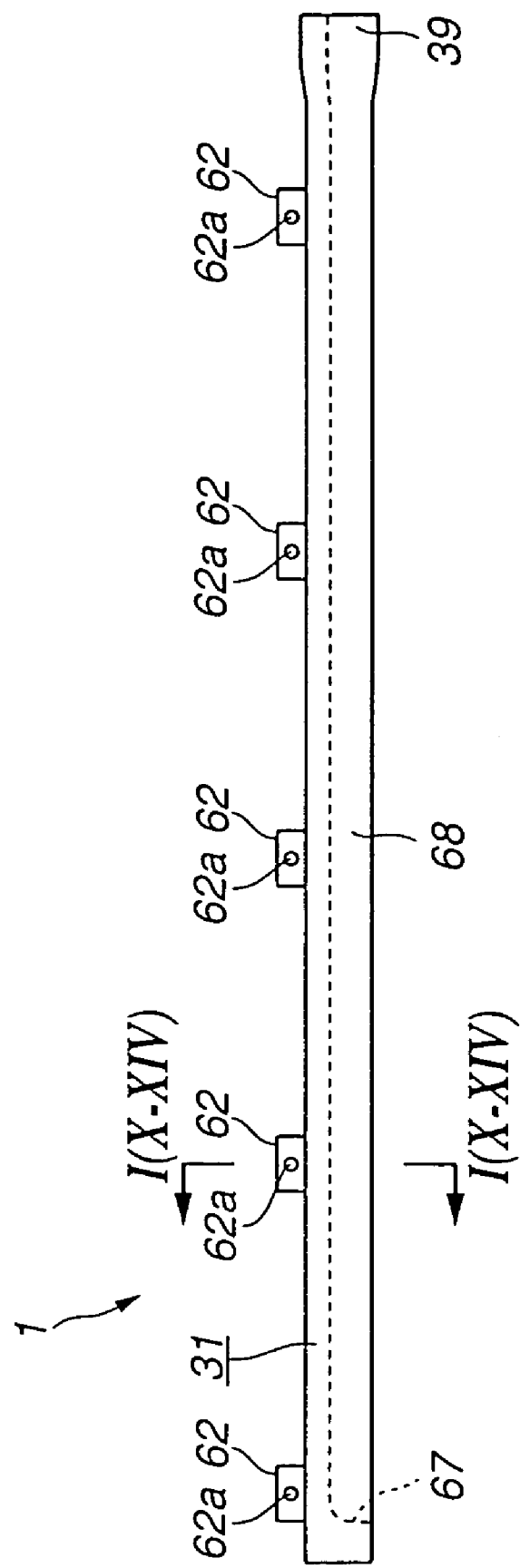
FIG. 4 is a view similar to FIG. 3, showing the airbag as folded.
Figure 9:
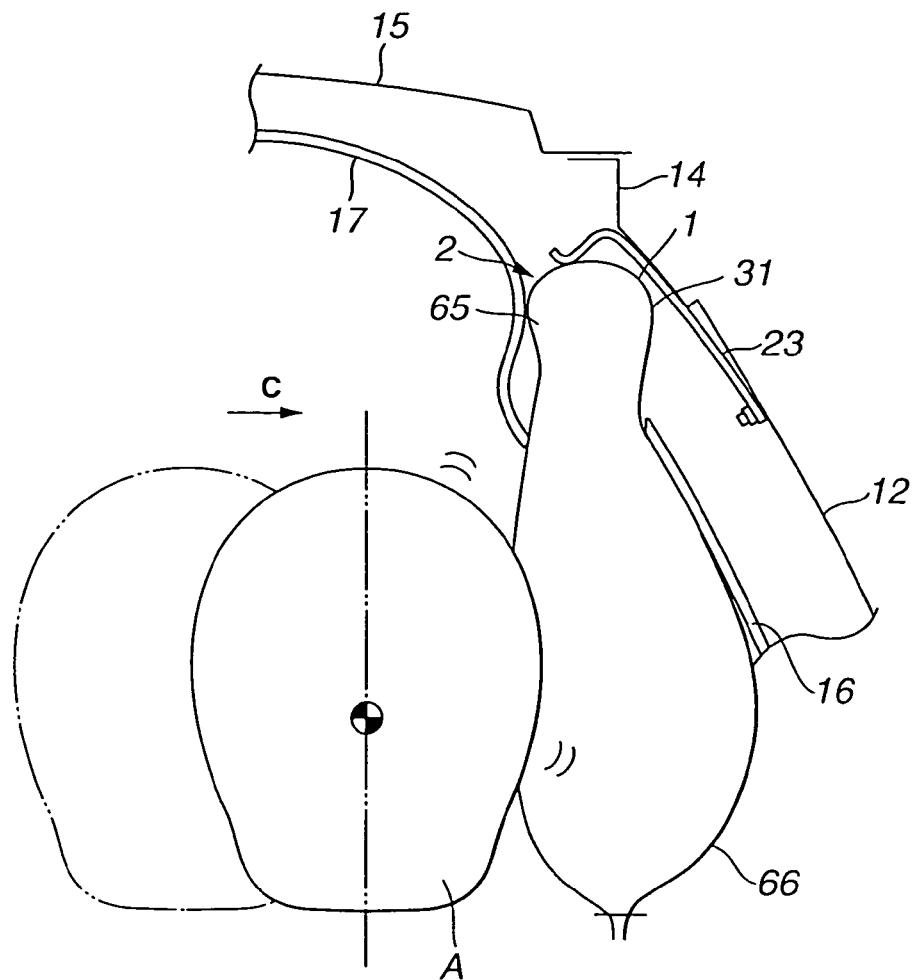
Figure 11:
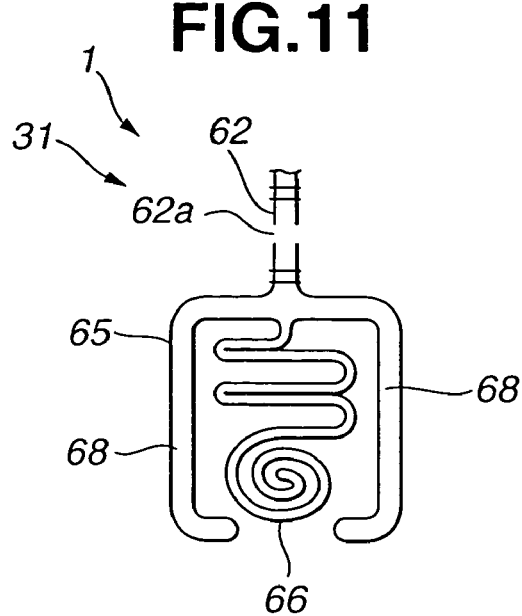
FIG. 11 is a view similar to FIG. 10, taken along the line XI—XI in FIG. 4, showing another variation of the first embodiment.
Figure 12:
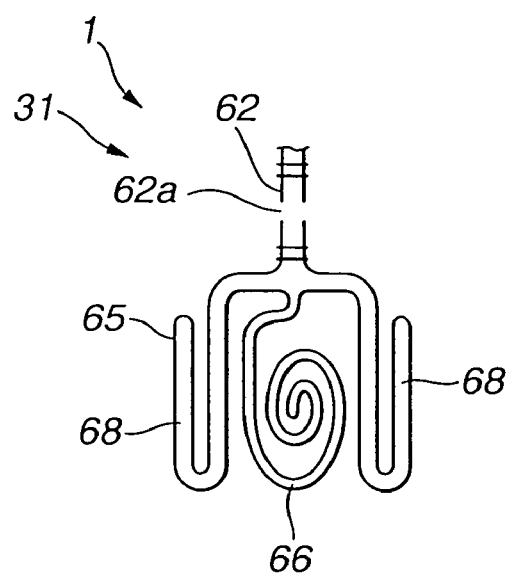
Figure 13:
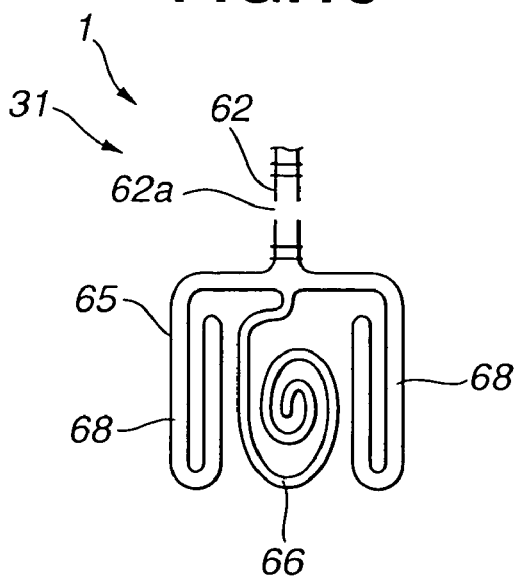
Figure 14:
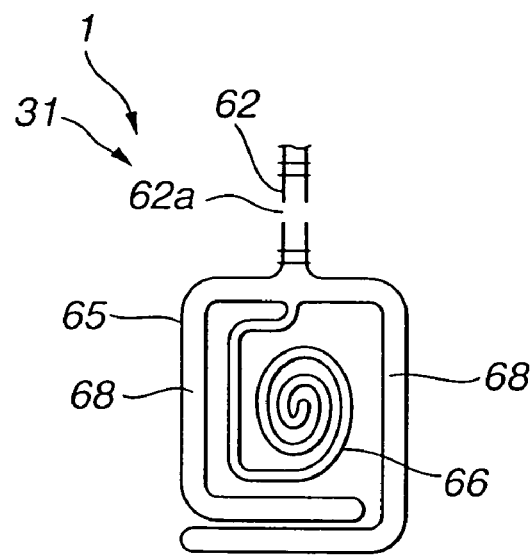
Figure 15:
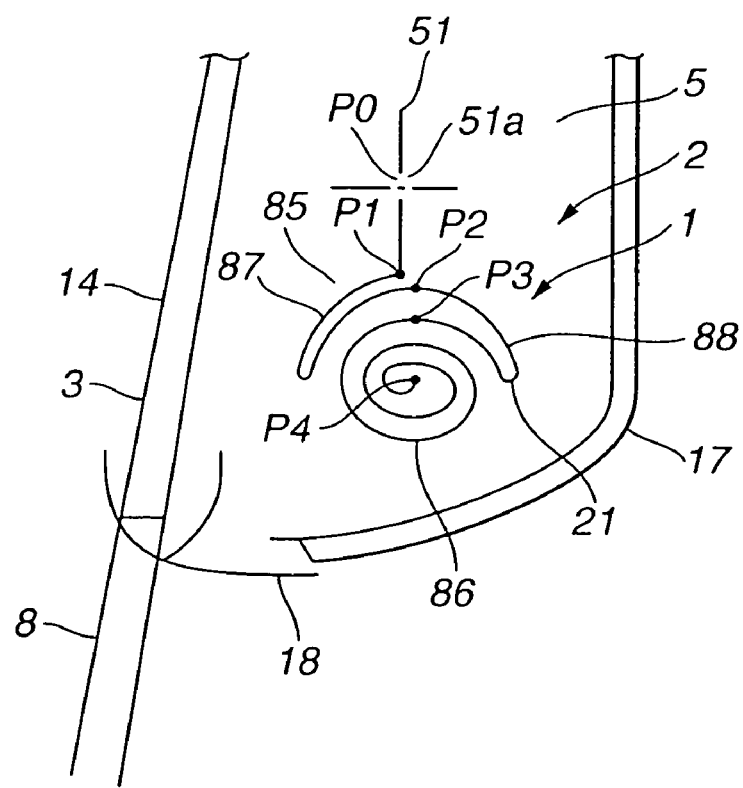
Figure 16:
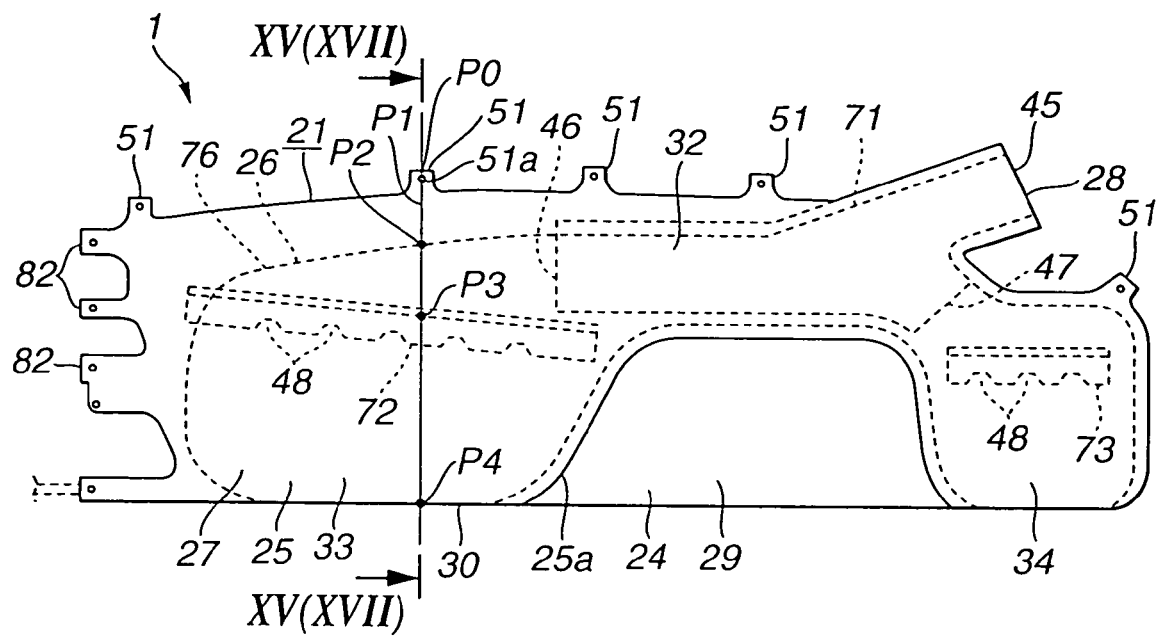
Figure 17:
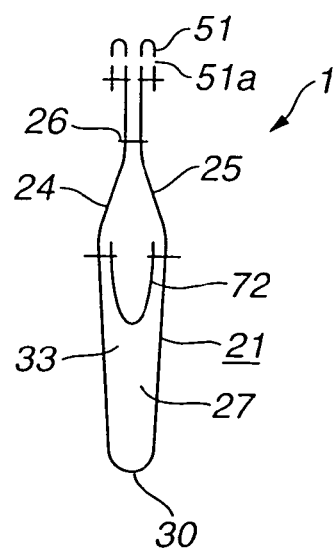
Figure 18:
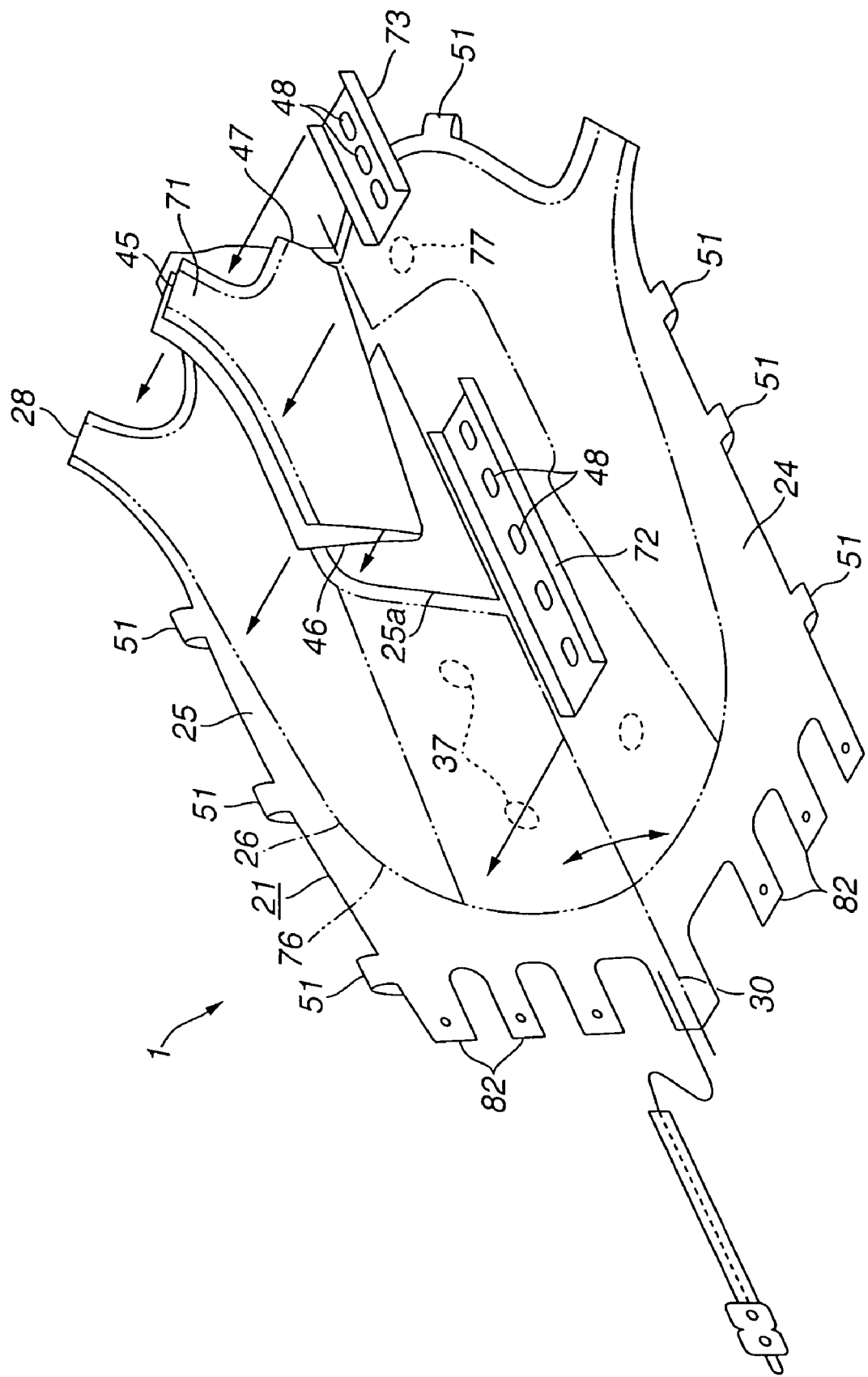
Figure 19:
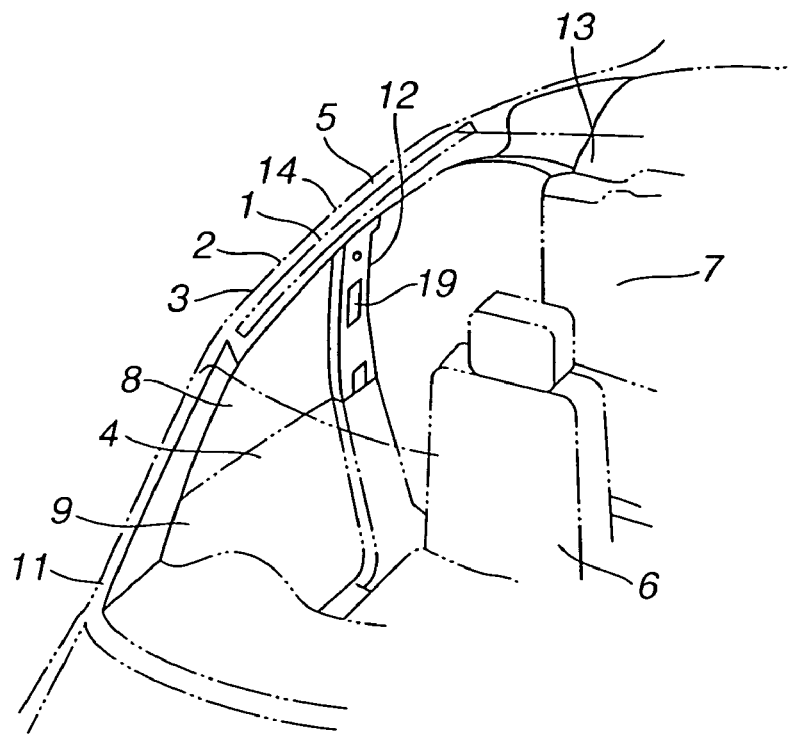
Figure 20:
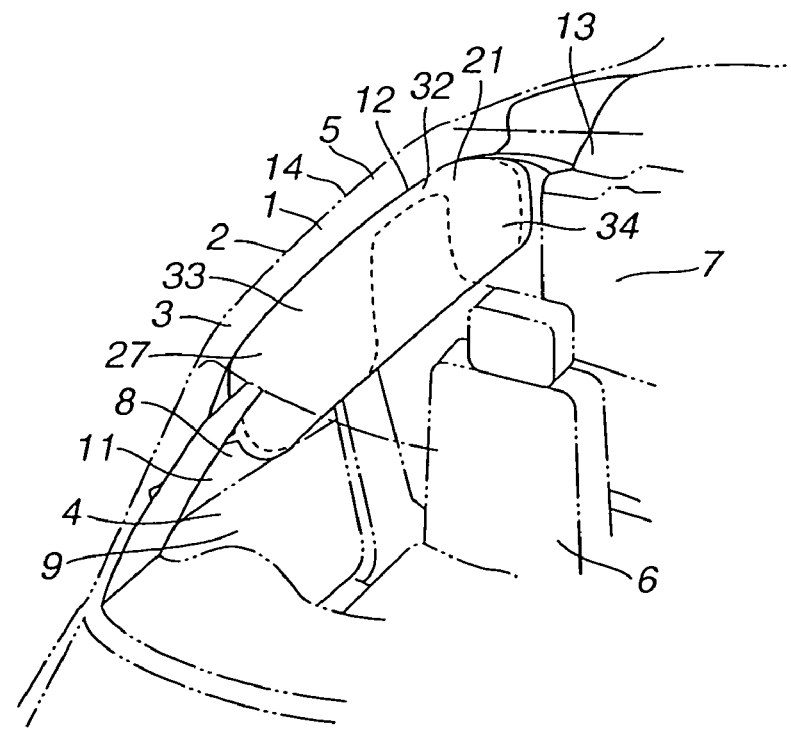
Figure 26:
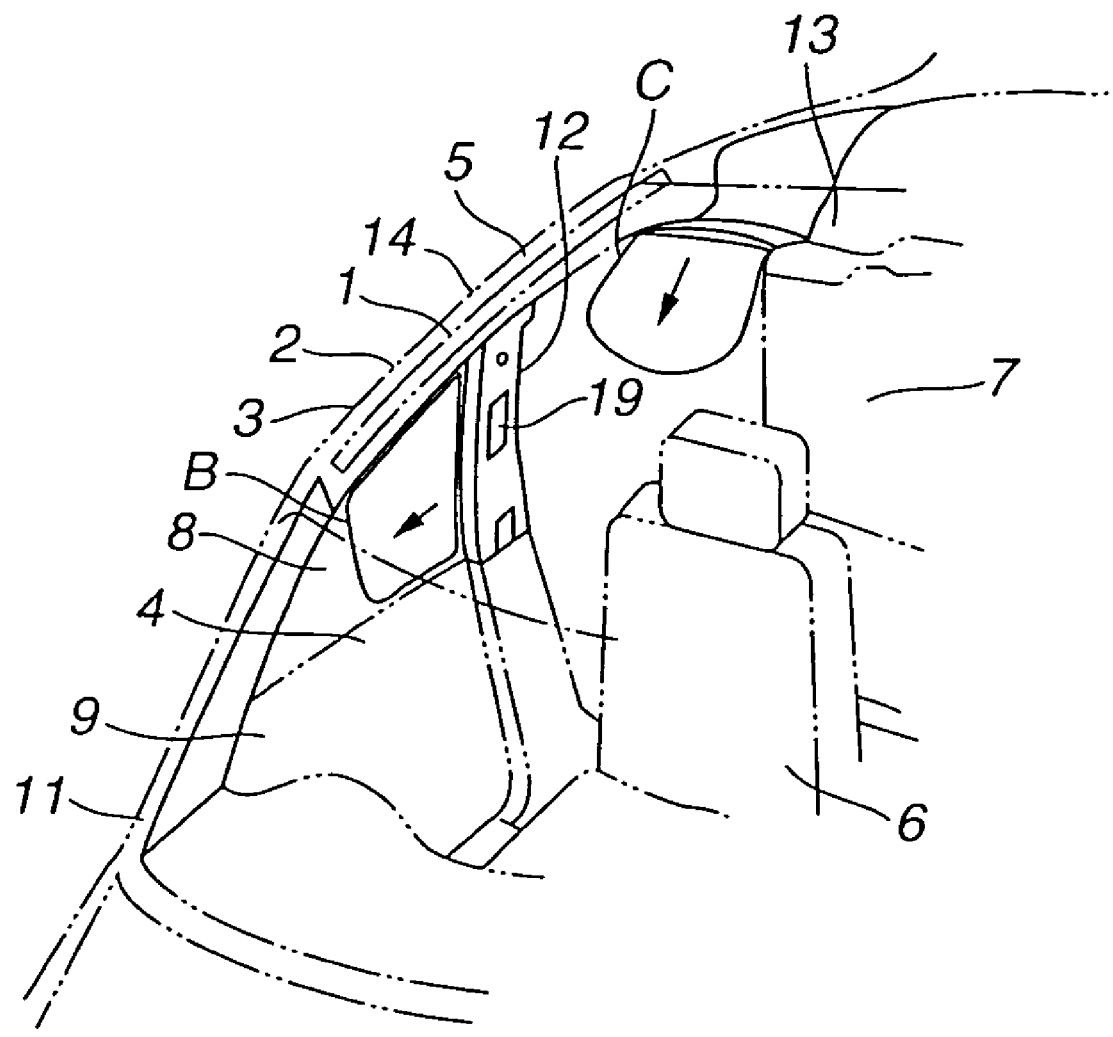
Figure 27:
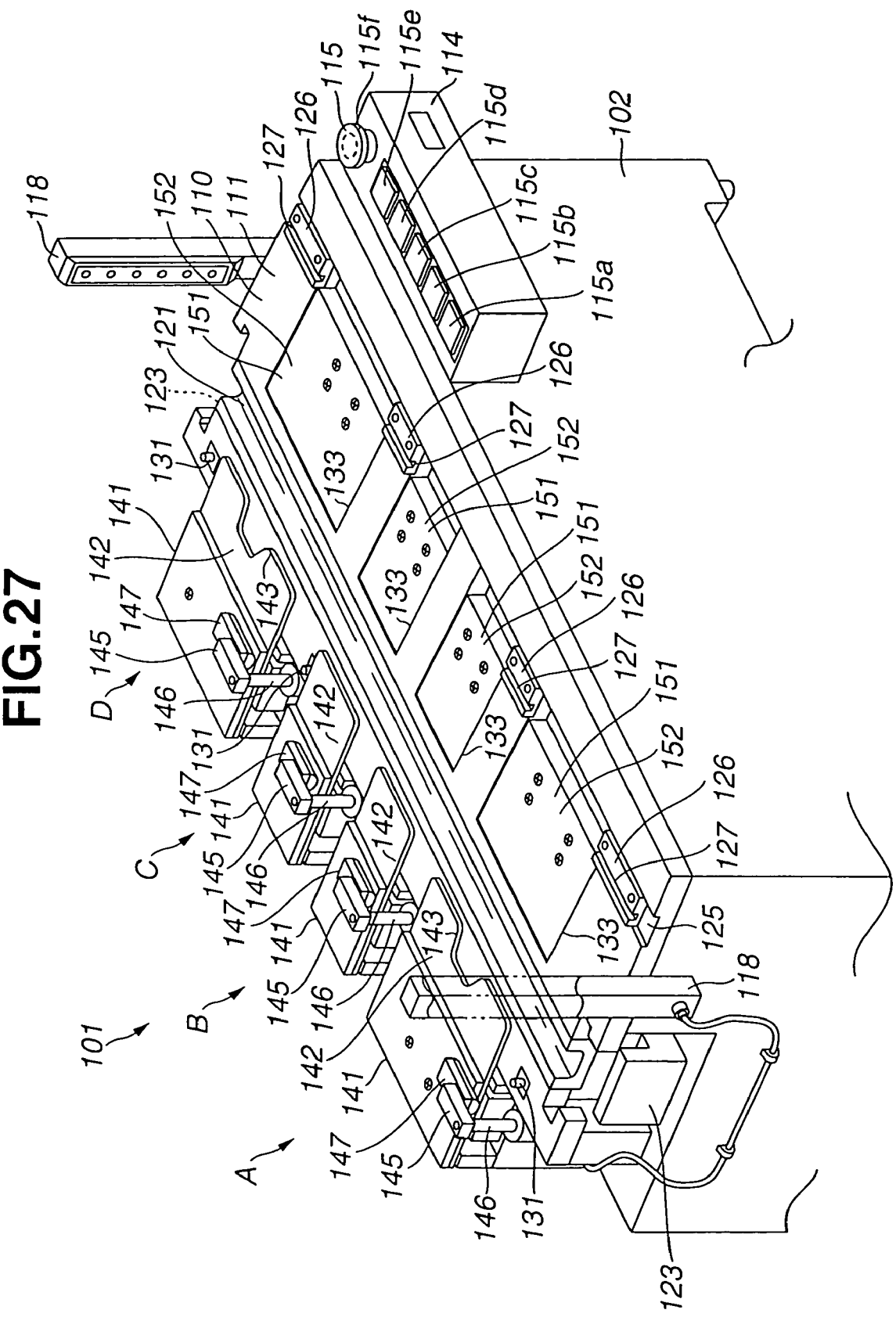
Figure 28:
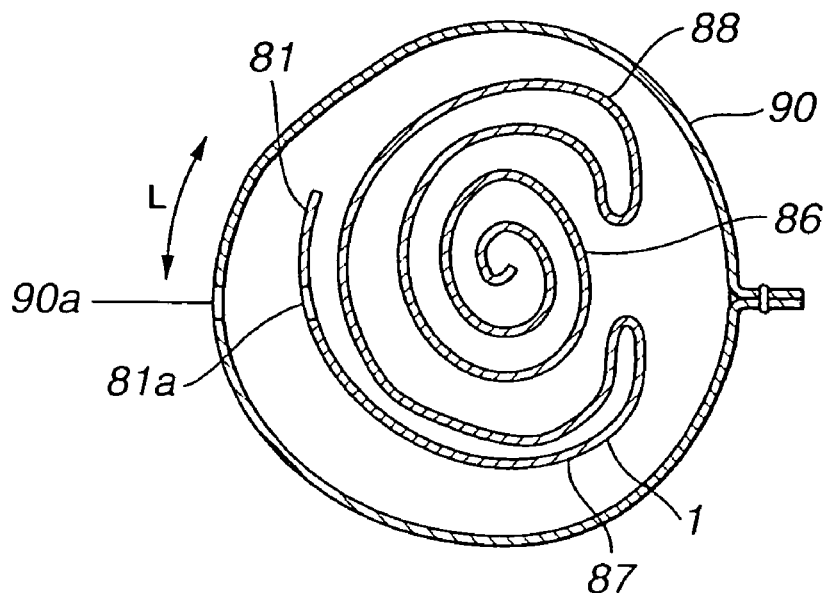
Figure 29:
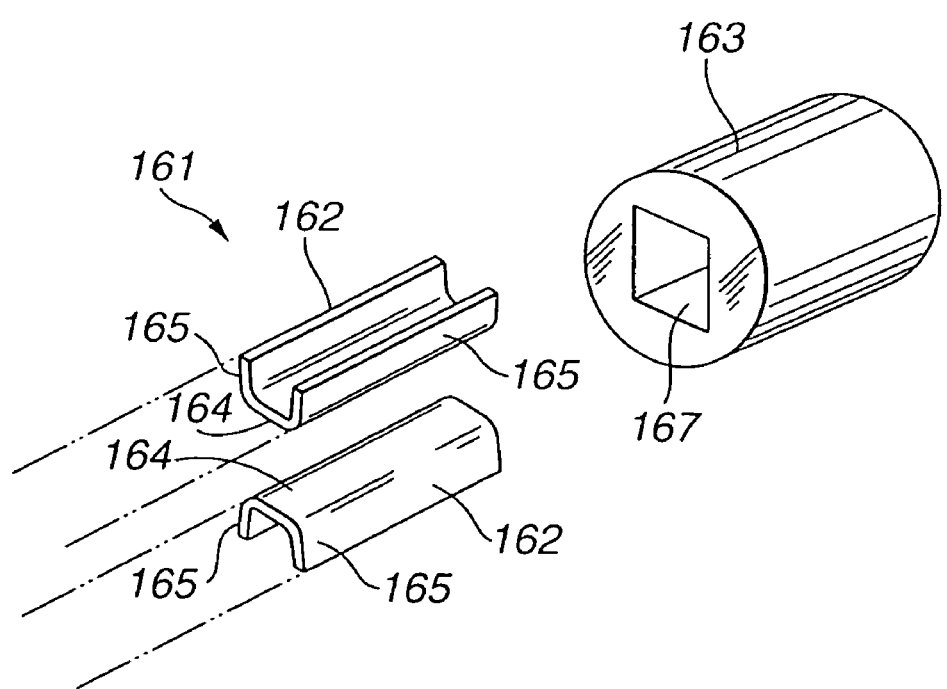
Figure 30:
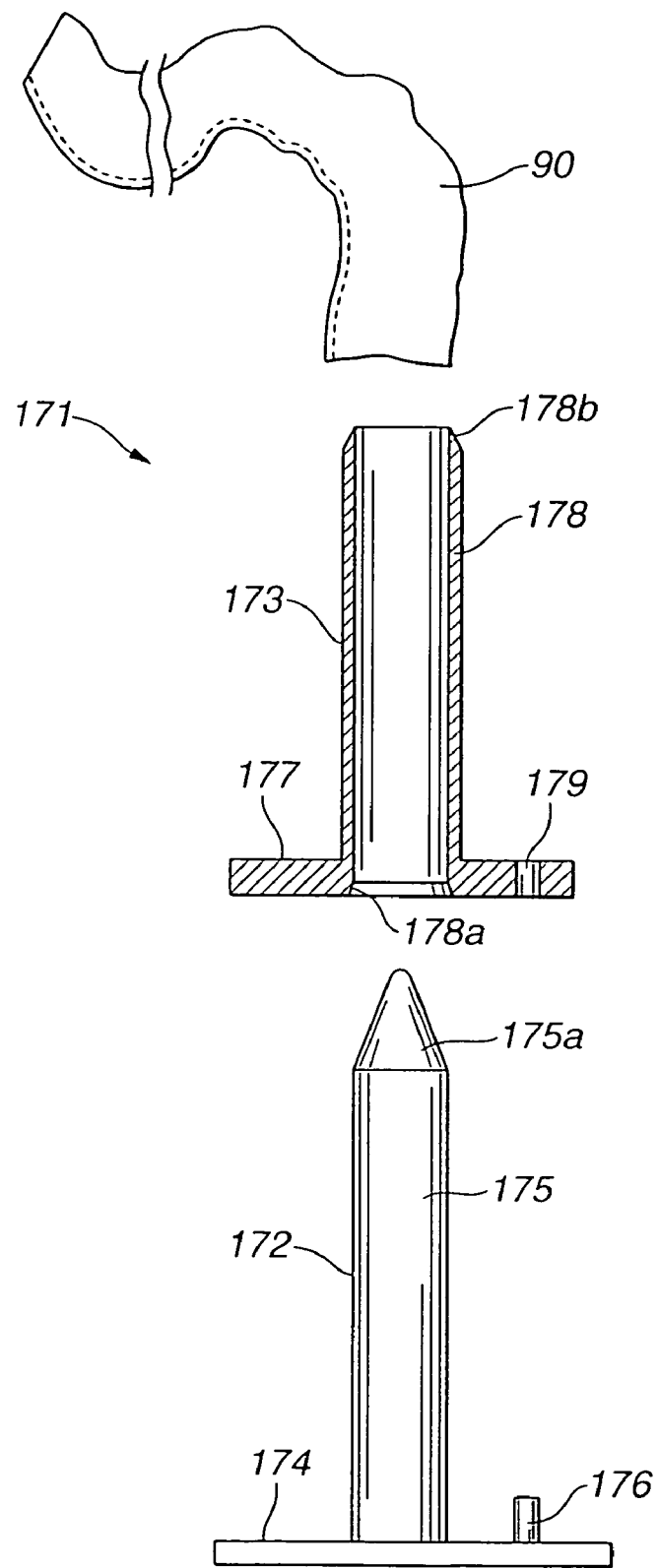
Figure 31:
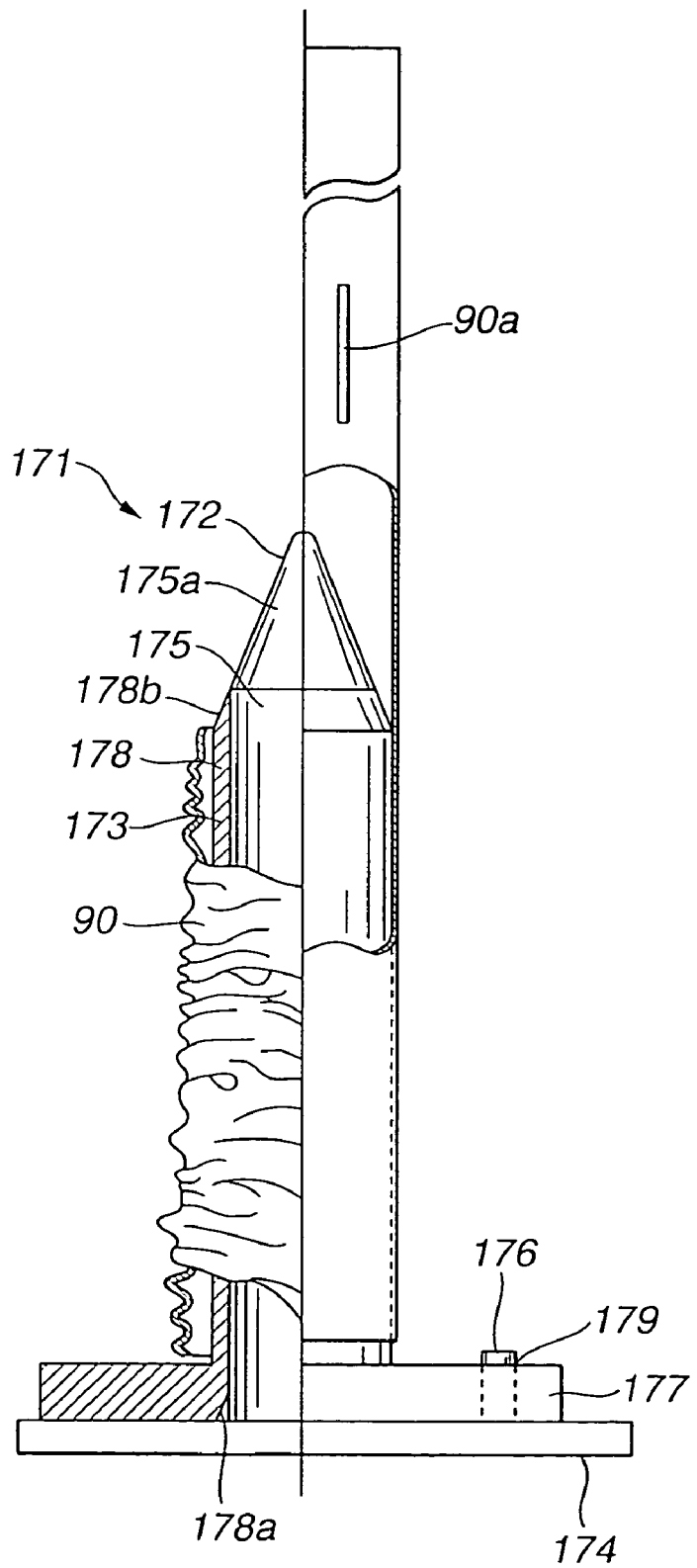
Figure 46:
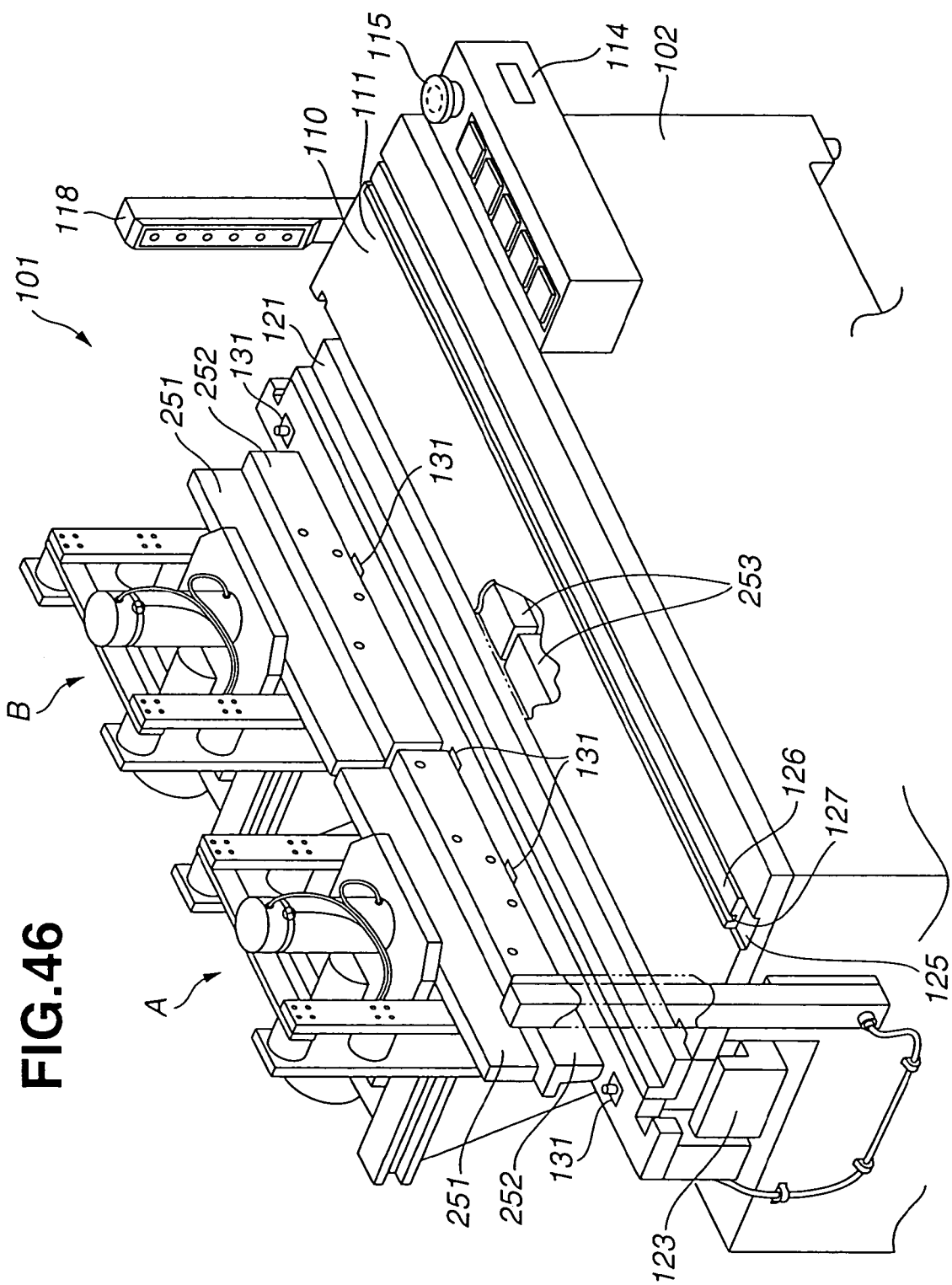
Figure 47:
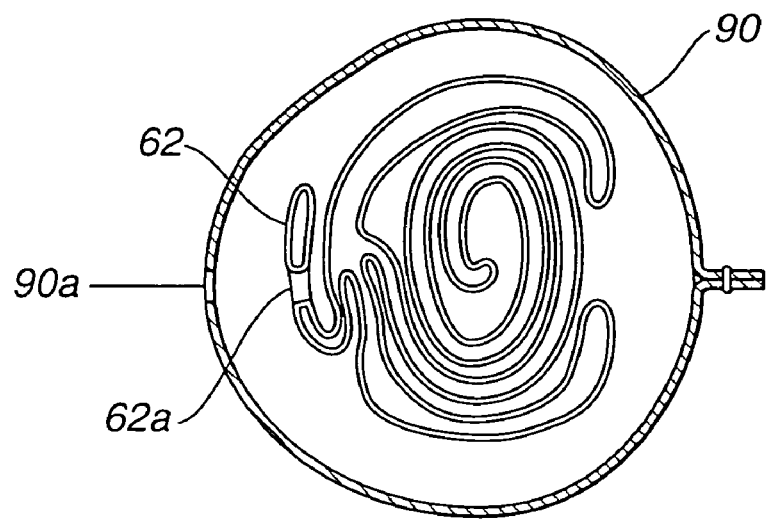
Figure 48:
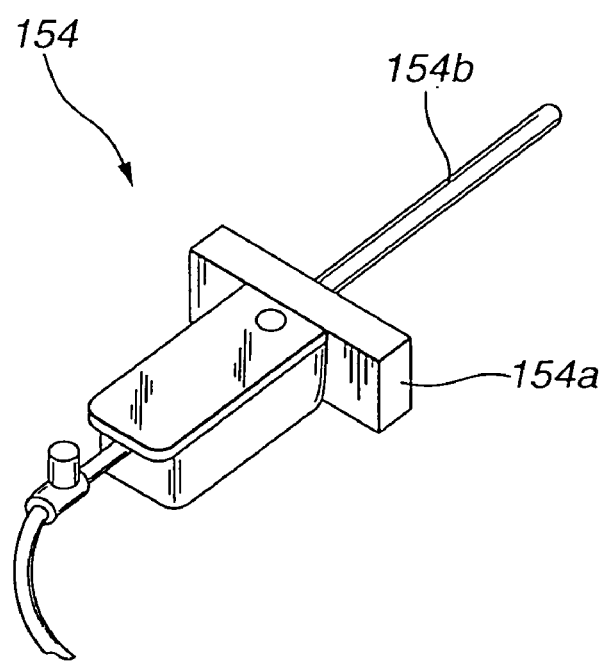

Flak 12 is a view similar to FIG. 11, taken along the line XII—XII in FIG. 4, showing still another variation of the first embodiment;

FIG. 13 is a view similar to FIG. 12, taken along the line XIII—XIII in FIG. 4, showing the other variation of the first embodiment;

FIG. 14 is a view similar to FIG. 13, taken along the line XIV—XIV in FIG. 4, showing a further variation of the first embodiment;

FIG. 15 is a view similar to FIG. 14, taken along the line XV—XV in FIG. 16, showing a second embodiment of the present invention;

FIG. 16 is a view similar to FIG. 3, showing the airbag as spread;

FIG. 17 is a view similar to FIG. 15, taken along the line XVII—XVII in FIG. 16, showing the airbag;

FIG. 18 is an exploded perspective view showing the airbag;

FIG. 19 is a fragmentary perspective view showing the vehicle provided with an airbag device with airbag accommodated;

FIG. 20 is a view similar to FIG. 19, showing the vehicle provided with the airbag device with airbag deployed;

FIGS. 21–25 are views similar to FIG. 9, for explaining the deployment process of the airbag;

FIG. 26 is a view similar to FIG. 20, showing a variation of the second embodiment;

FIG. 27 is a perspective view showing a third embodiment of the present invention, which is involved in a system for folding an airbag;

FIG. 28 is a sectional view showing the airbag inserted through a sleeve;

FIG. 29 is a view similar to FIG. 27, showing a saber and a saber stop which constitute the folding system;

FIG. 30 is an exploded schematic view showing a sleeve mounting device;

FIG. 31 is a diagrammatic view, partly in section, showing the sleeve mounting device;

FIGS. 32–39 are schematic side views for explaining the folding process of the airbag;

FIGS. 40–45 are diagrammatic drawings for explaining the folding process of the airbag;

FIG. 46 is a view similar to FIG. 27, showing a fourth embodiment of the present invention, which is involved in a system for folding an airbag;

FIG. 47 is a view similar to FIG. 28, showing the airbag inserted through the sleeve;

FIG. 48 is a view similar to FIG. 46, showing an air nozzle; and

Figure 32:
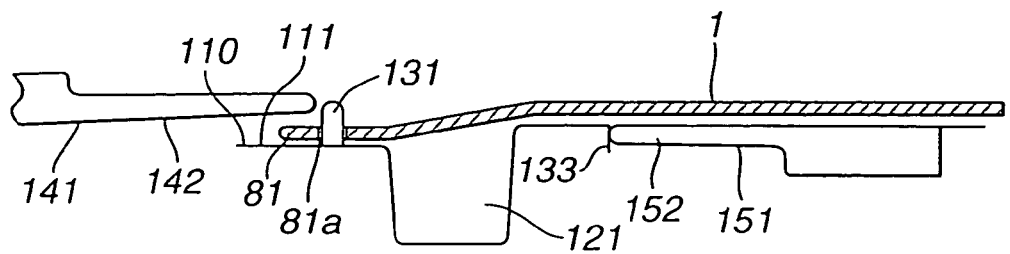

FIGS. 49–53 are views similar to FIG. 32, for explaining the folding process of the airbag;

DETAILED DESCRIPTION OF THE INVENTION

Referring to the drawings wherein like reference numerals designate like parts throughout the views, a description is made about an automotive airbag and a folding method and system thereof embodying the present invention.

Referring to FIGS. 1–14, there is shown a first embodiment of the present invention.

Figure 2:
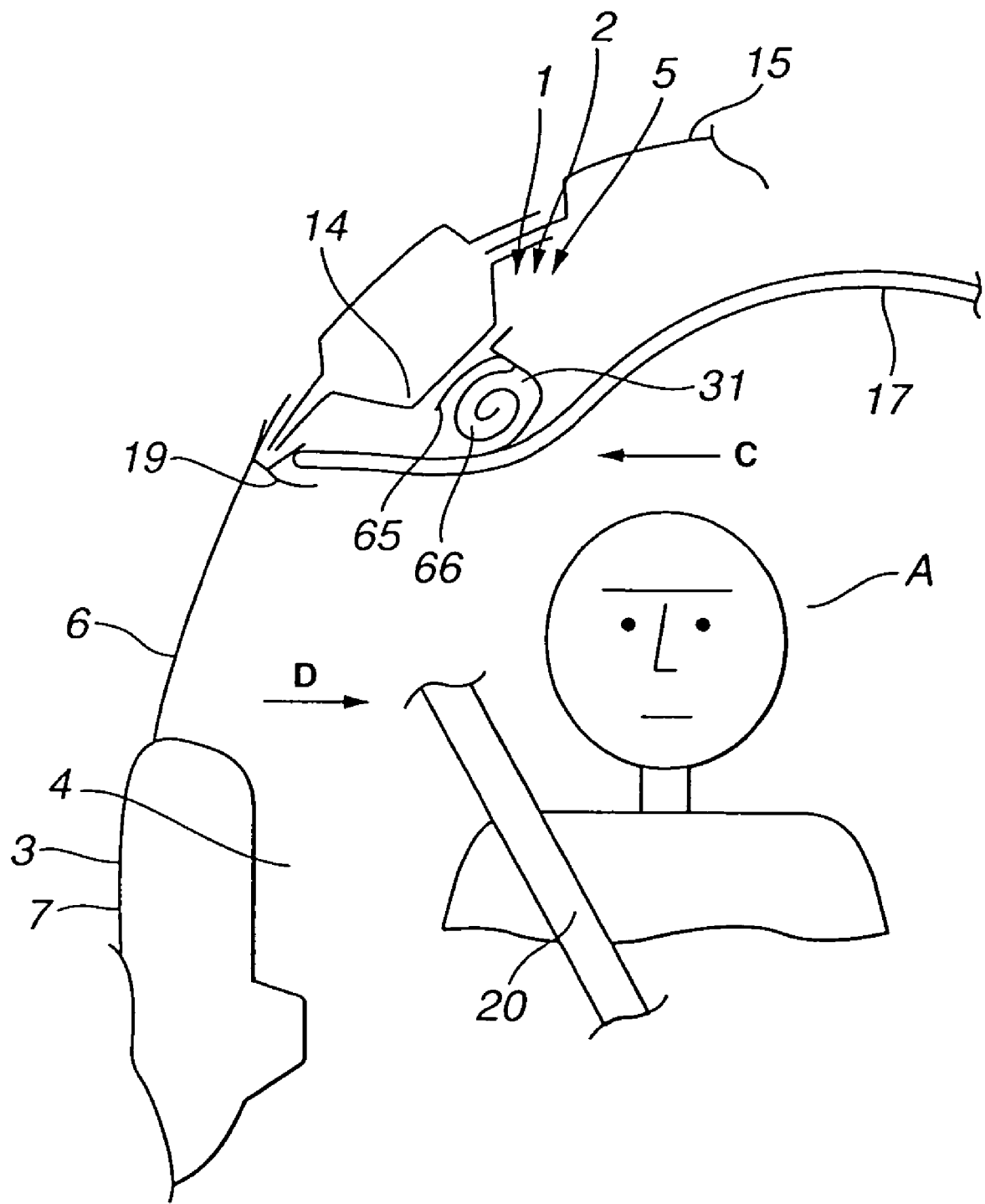
FIG. 2 is a schematic view showing the airbag mounted to the vehicle.

Referring to FIG. 2, an airbag 1 is arranged in an airbag device 2 disposed at a roof side 5 in a cabin 4 of an automobile or vehicle 3. This airbag 1, which is also referred to as curtain airbag, side-collision airbag, side airbag, inflatable curtain-type airbag or head protection airbag, deploys like a sheet to the side of a seat occupant or passenger A when undergoing an impact due to side collision and the like, restraining the occupant A as an object to be restrained.

Figure 5:
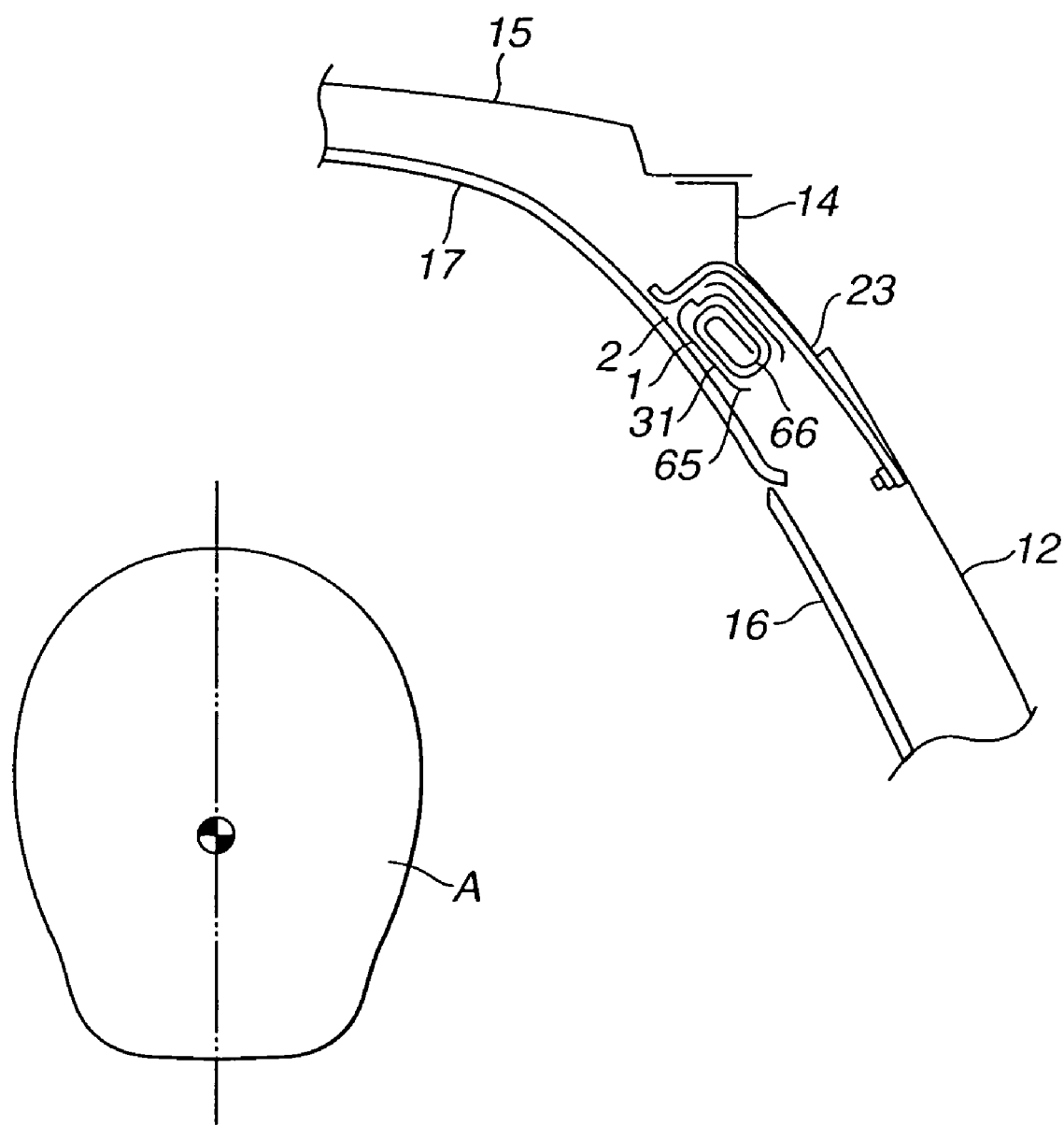
FIGS. 5–9 are views similar to FIG. 2, for explaining the deployment process of the airbag.

The automotive vehicle 3 is provided, in the cabin 4, with front and rear seats on which the occupant A can be seated, and doors 7 corresponding to the front and rear seats and having side windows 6 capable of being open upward. Arranged on both sides of the cabin 4 are an A-pillar, a B-pillar 12, and a C-pillar in order from the front. Referring to FIGS. 2 and 5, a ceiling panel 15 is supported on the top of the pillars 12 through a roof side rail 14. A pillar garnish 16 is mounted to each pillar 12 on the side of the cabin 4, and a head lining or soft or deformable ceiling board 17 is mounted to an area of the cabin 4 extending from the ceiling panel 15 to the roof side rail 14. And a packing 19 is mounted in a position of the cabin 4 corresponding to the top of the door 7 to allow close contact with the door 7. Each seat is provided with a seat belt 20, and each pillar 12 is provided with a support, not shown, for supporting the seat belt 20.

The airbag device 2 is a so-called front/rear seat airbag which allows restraint of the occupants seated in the front and rear seats. The airbag device 2 comprises airbag 1 folded in narrow shape and accommodated in the roof side 5 surrounded by the roof side rail 14, the head lining 17, etc., and an inflator accommodated in a space of a vehicle body above the rear-seat occupant and for supplying gas to the airbag 1. The airbag device 2 is mounted to the roof side rail 14 through a bracket 23.

Referring to FIG. 3, the airbag 1 comprises a main body 31 formed like a flat bag by combining a plurality of cloths. A tension strap or cord-like cloth, not shown, is mounted to the airbag main body 31 at the front end.

The airbag main body 31 comprises a bag-like expansion part 38 obtained by placing one upon another an outside cloth 35 disposed outside or on the side of the vehicle body and an inside cloth 36 disposed on the side of the cabin 4 and sewing the two cloths together at a predetermined sewing area or junction 37 and for receiving inflow of gas for expansion and deployment, a gas inlet or one end 39 located at the back and in the upper portion of the airbag main body 31 or in the back of the vehicle body to ensure communication between the expansion part 38 and the outside, and a sheet-like non-expansion part 41 which receives no gas inflow and thus has no expansion and deployment. The expansion part 38, which is an air chamber or hollow, comprises a communication 43 located in the center of the upper portion of the airbag main body 31 in the length direction or longitudinal direction thereof, a front-seat expansion compartment or front-seat restraining part or area 44 communicating with the front of the communication 43, a rear-seat expansion compartment or rear-seat restraining part or area 45 communicating with the back of the communication 43.

The sewing area 37 comprises an outer-peripheral sewing part or connection 51 for sewing the outer periphery of the expansion part 38, and at least one restriction 52 for restricting the width upon deployment of the expansion compartments 44, 45. The at least one restriction 52 is located in one spot or spots in the expansion part 38, and is formed integrally or differently from the outer-peripheral sewing part 51. In this embodiment, the at least one restriction 52 includes a first portion 54 continuously extending to the outer-peripheral sewing part 51, a second portion 55 independent of the outer-peripheral sewing part 51, and a third portion 56 continuously extending to the outer-peripheral sewing part 51 in the front-seat expansion compartment 44, and fourth and fifth portions 57, 58 continuously extending to the outer-peripheral sewing part 51 in the rear-seat expansion compartment 45. Moreover, a protector 59 is formed at an end of each restricting portions 54–58 to protect the end.

A plurality of mounting pieces or lugs 62 is formed at the upper edge of the airbag main body 31 for mounting to the bracket 23, Each mounting piece 62 is formed with a through hole 62a for engagement with a mounting means such as screw.

Figure 1A:
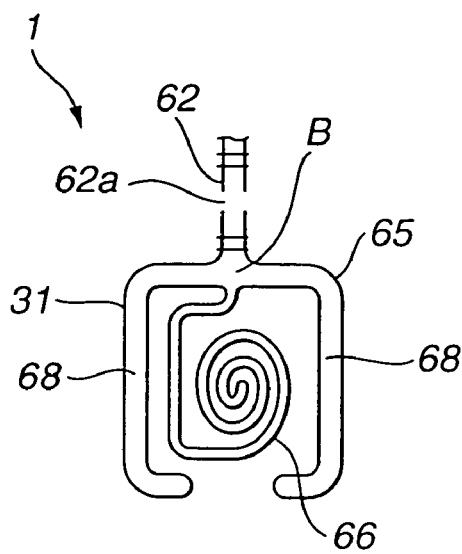
FIGS. 1A–1C are schematic sectional views taken along the line I—I in FIG. 4, for explaining the deployment process of an airbag embodying the present invention.

Referring to FIGS. 1A, 4, and 5, the airbag 1 is folded in a shape having, principally, a duct part 65 and an aggregative part 66. The duct part 65 has a gas passage position B including the communication 43 and allowing linear communication between the gas inlet 39 located at the rear end of the expansion part 38 and a front or another end 67 located at the front end of the expansion part 38, i.e. throughout the length of the airbag 1. The duct part 65 is formed like a cylinder with the gas passage position B as substantial center. The duct part 65 is folded as crushed flat from top and bottom, and includes arms 68 extending radially from the gas passage position B. The arms 68 are bent roughly like a C-shape to surround the aggregative part 66 located below the duct part 65. On the other hand, the aggregative part 66 includes, principally, portions of the front-seat expansion compartment 44 and the rear-seat expansion compartment 45, and communicates directly with the lower side of the gas passage position B of the duct part 65. The aggregative part 66 is wound from the lower end in a predetermined direction, i.e. it is folded like a roll to form roughly a parasol or a pantograph in its entirety. Note that the predetermined direction is a direction of the rewinding aggregative part 66 along the windows 6. By way of example, the airbag 1 mounted on the left side as viewed from the front is wound counterclockwise from the lower end as shown in FIGS. 1A–2.

FIGS. 5–9 show airbag device 2 and occupant A as seen from the back of the vehicle 3. Upon side collision of the vehicle 3 and the like, the occupant A is moved outward or in the direction of arrow C in FIG. 2, whereas the door 7 and the roof side rail 14 are moved inward or in the direction of arrow D in FIG. 2, reducing a space between the vehicle body and the occupant A. With the airbag device 2, when undergoing an impact due to side collision and the like, the inflator is actuated by a control unit, not shown, to inject gas, which is introduced into the airbag 1 through the gas inlet 39. Then, gas passing from the gas passage position B of the duct part 65 to the front end 67 is supplied to the expansion compartments 44, 45 of the aggregative part 66, causing expansion and deployment of the airbag 1. Deforming the head lining 17 and the like, the airbag 1 quickly protrudes downward from the roof side 5 to cover the front and rear windows 6 like a curtain, achieving restraint of the head and chest of the occupants seated in the front and rear seats.

Figure 6:
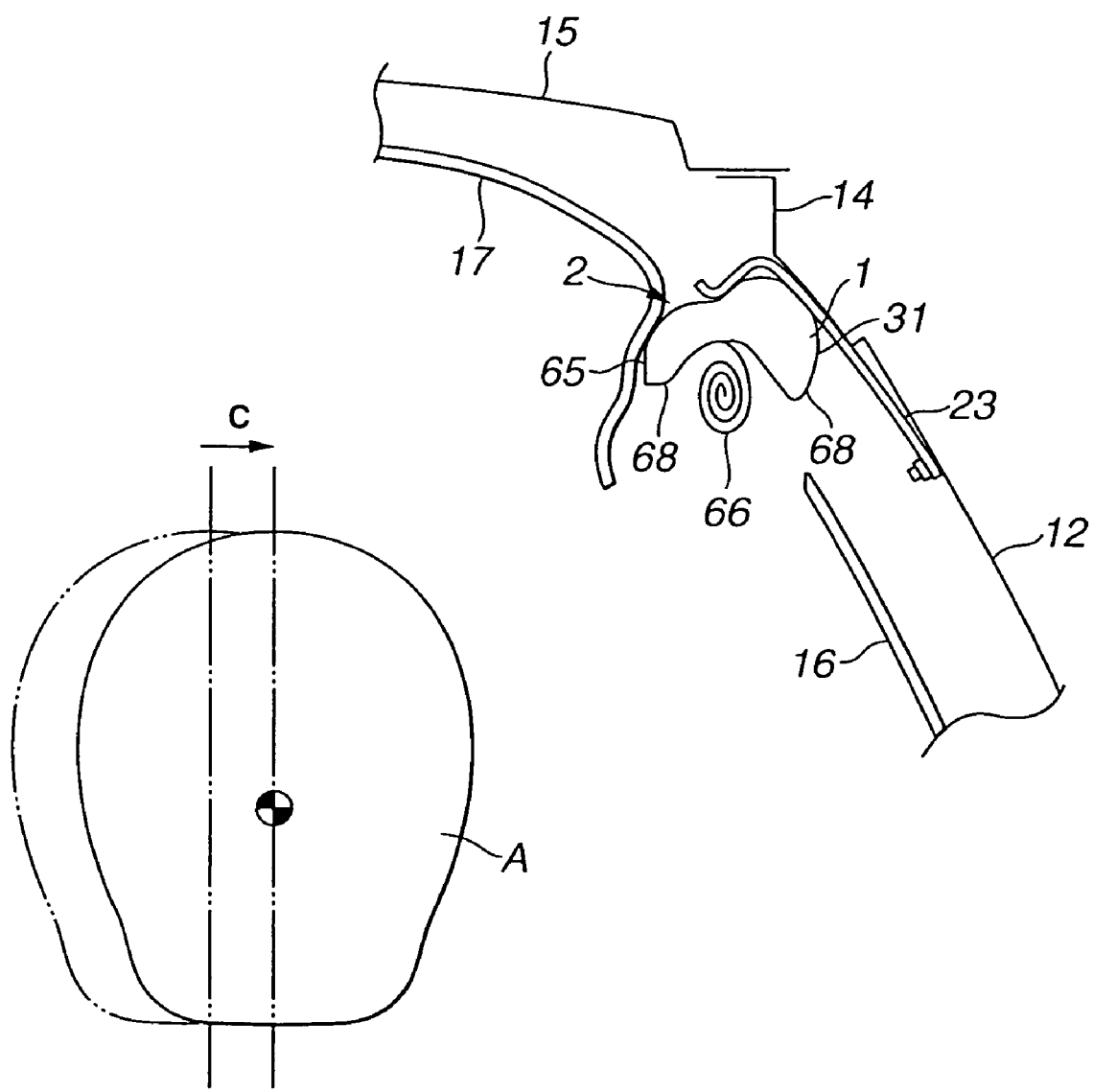
Figure 7:
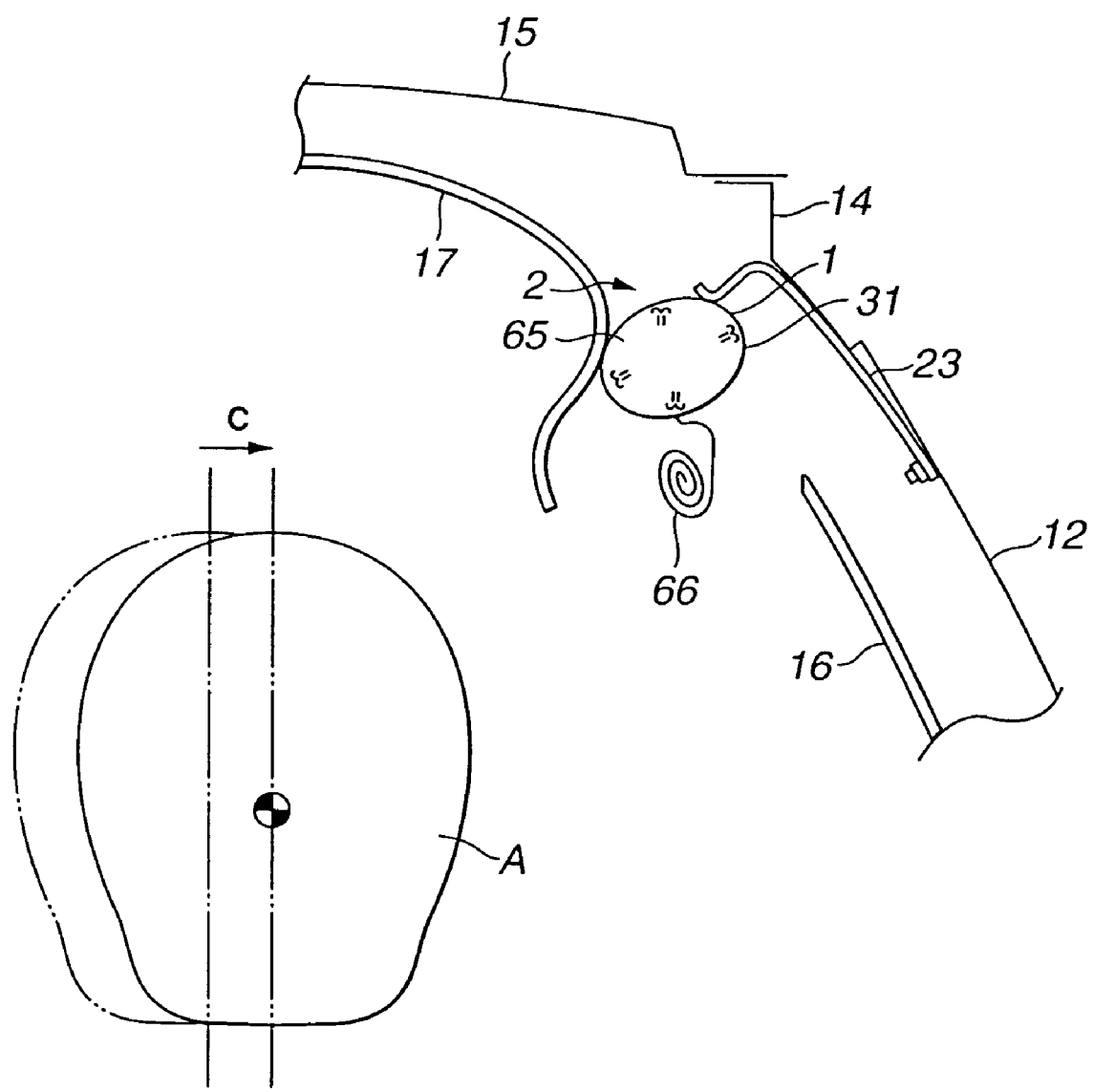

The deployment of the airbag 1 is described in detail. Since the aggregative part 66 folded like a roll is greater in gas-flow resistance upon deployment than the duct part 65 folded in a simply crushing way, gas supplied from the inflator expands the duct part 65 from the state as shown in FIGS. 1A and 5 to the state as shown in FIG. 6. At that time, since the duct part 65 is folded as crushed from top and bottom, expansion of the duct part 65 pushes the head lining 17 to secure a projecting opening of the airbag 1, whereas the aggregative part 66 is moved to the cabin 4 by a reaction force produced by the duct part 65 pushing the vehicle-body surface.

Figure 1B:
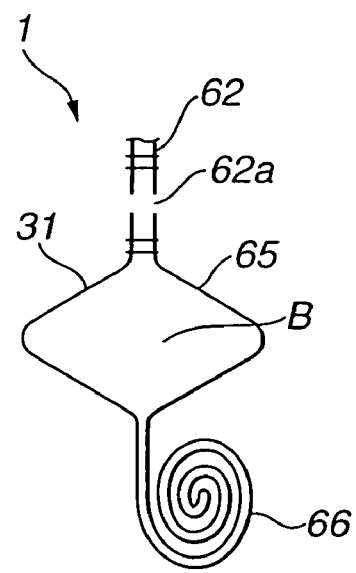
Figure 1C:
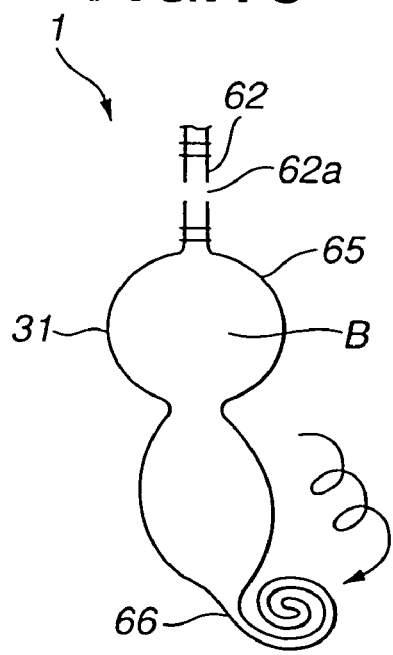
Figure 8:
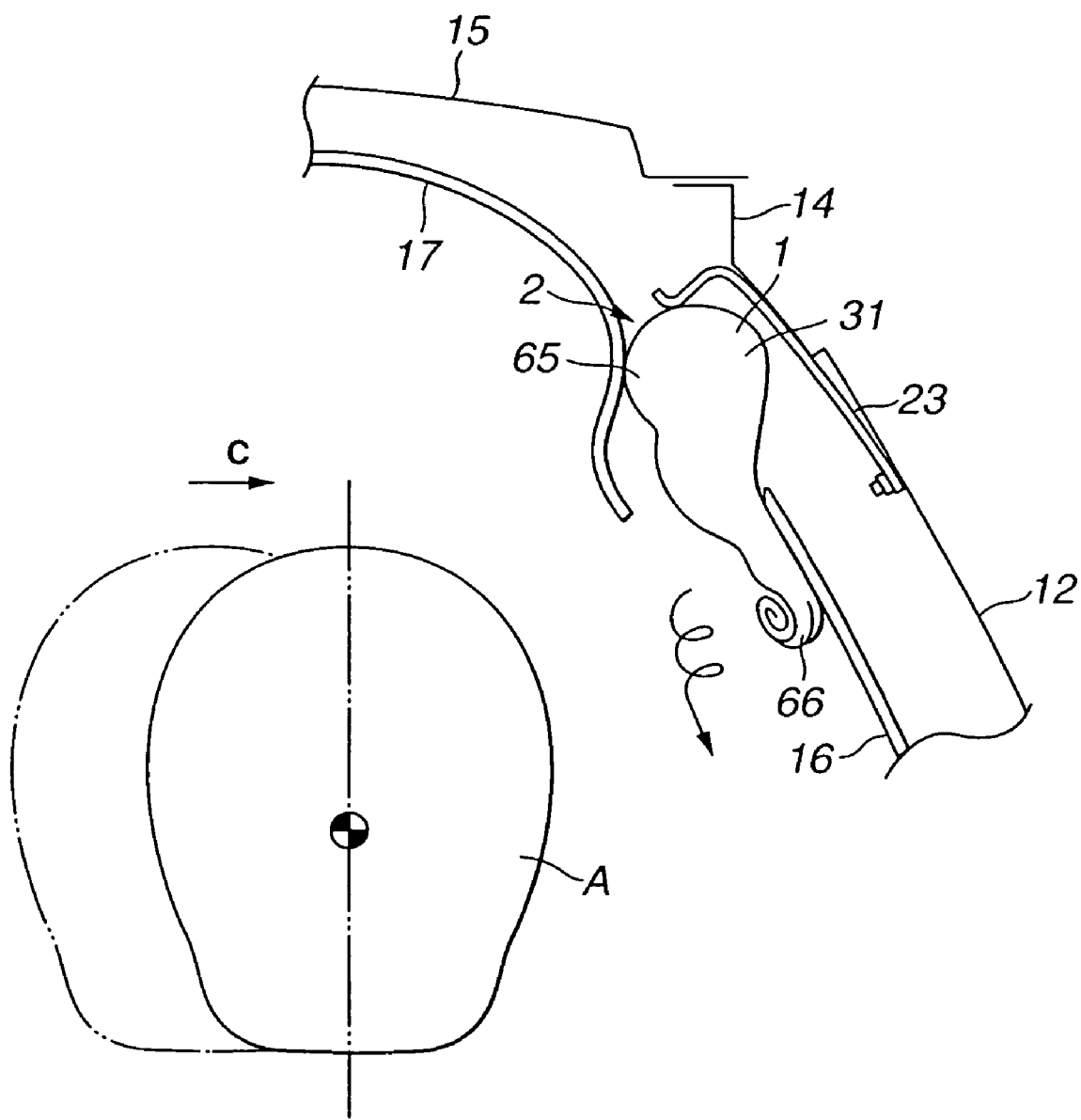

With further expansion of the duct part 65, referring to FIGS. 1B and 5, the expanding duct part 65 pushes downward the aggregative part 66, which is guided by the arms 68 of the duct part 65 to achieve stable downward extension. Then, gas is supplied from the duct part 65 to the aggregative part 66, which thus deploys downward in a rolling way along the windows 6 or the pillars 12 as shown in FIGS. 1C and 8, achieving restraint of the head of the occupant A as shown in FIG. 9.

In such a way, in this embodiment wherein the airbag 1 is constructed to deploy from the roof side rail 14 along the inner side face of the windows 6 so as to achieve restraint of the head and the like of the occupant A, the airbag 1 can expand and deploy in a predetermined position quickly and smoothly.

Specifically, with the airbag 1, folding of the duct part 65 is carried out according to a folding method having minimum number of folds and less resistance of deployment, i.e. a so-called parasol folding method having the gas passage position B arranged to allow communication throughout the length in the longitudinal direction of the duct, part 65 and allowing easy securing of the gas passage position B. This allows efficient and quick supply of gas throughout the length of the long airbag 1, and also from the duct part 65 to the aggregative part 66 as an occupant restraining area, resulting in quick deployment of the airbag 1 without any time difference between the front and the back in the longitudinal direction.

Further, the duct part 65 expands and deploys quickly while the roll-like aggregative part 66 deploys after the duct part 65. This allows the aggregative part 66 to stably deploy downward or in a predetermined direction without having unstable deployment in the roof side 5.

Furthermore, the duct part 65 expands and deploys quickly while the roll-like aggregative part 66 deploys after the duct part 65, so that upon deployment, the duct part 65 obtained by folding the upper portion of the airbag 1 cylindrically and then flat pushes the head lining 17 and the like to form a projecting opening of the airbag 1. This allows the roll-like aggregative part 66 to stably deploy downward or in a predetermined direction.

Further, the duct part 65 is substantially symmetrical in the right and left or the front and back with respect to a deployment path line of the airbag 1. This allows the roll-like aggregative part 66 to stably deploy downward or in a predetermined direction.

Still further, the duct part 65 is folded flat, and the arms 68 are arranged to envelop both sides of the aggregative part 66, so that upon deployment, the arms 68 secure a projecting opening of the aggregative part 66 and define a projecting direction thereof.

This allows the roll-like aggregative part 66 to stably deploy downward or in a predetermined direction.

Furthermore, the duct part 65 is arranged above the aggregative part 66, achieving quick and stable downward deployment of the aggregative part 66, allowing the airbag 1 to be provided between a vehicle-body member such as door trim and the occupant A.

The projecting direction or deployment behavior of the airbag 1 can be stabilized as described above, resulting in restraint of interference between the airbag 1 and the pillars 12, the seat belt 20, the occupant A or the like.

Further, the aggregative part 66 is folded like a roll facing the cabin 4, resulting in smooth deployment of the aggregative part 66 without interfering with the pillar garnish 16, panes of the windows 6, the occupant A and the like.

Still further, if the airbag 1 includes roll-like aggregative part 66 only, the gas-flow resistance becomes greater to increase a load applied to the cloths of the airbag 1. In this embodiment, the airbag 1 comprises a combination of the roll-like aggregative part 66 and the duct part 65, resulting in restraint of a load to be applied to the cloths of the airbag 1.

Furthermore, the cloths of the airbag 1 have enhanced heat resistance temperature, and do not undergo a harmful thermal effect when lowering the temperature of gas generated by the inflator, requiring no arrangement of a separate and distinct inner pipe inside the airbag main body 31, resulting in reduction in number of parts and thus manufacturing cost, and in small-sized folding of the airbag 1.

It is noted that the shapes of the duct part 65 and the aggregative part 66 are not limited to those in the embodiment, and can be modified optionally.

Figure 10:
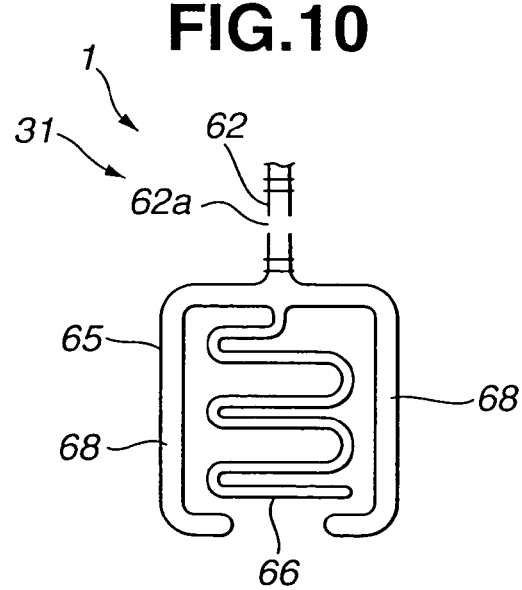
FIG. 10 is a view similar to FIG. 1A, taken along the line X—X in FIG. 4, showing one variation of the first embodiment.

By way of example, referring to FIGS. 10–14, the aggregative part 66 can be folded like a bellows in place of a roll as shown in FIG. 10, or can include a combination of a roll-like folded portion and a bellow-like folded portion as shown in FIG. 11. The duct part 65 can include arms 68 turned up outward for duplication as shown in FIG. 12, or turned up inward or to the aggregative part 66 for duplication as shown in FIG. 13, or having front ends placed one upon another below the aggregative part 66 for duplication as shown in FIG. 14. Optionally, the duct part 65 may include an appropriate combination of the structures as shown in FIGS. 10–14.

In the embodiment, the main body 31 of the airbag 1 is constructed by placing the outside cloth 35 and the inside cloth 36 one upon another. Alternatively, the airbag main body 31 can be constructed by turning up a single cloth, or by joining three or more cloths, or by using an appropriate reinforcing cloth joined on the cloths for enhancement in heat resistance and strength.

Moreover, setting of the joining positions of the cloths provides a form to the airbag 1, and facilitates folding of the airbag 1 which allows achievement of smooth gas flow, leading to reduction in manufacturing cost.

Further, the arms 68 of the duct part 65 can be arranged to extend in three or more directions in place of two directions.

Still further, in the embodiment, the airbag 1 is applied to the airbag device 2 for covering the side windows 6 of the vehicle 3. Optionally, the airbag 1 can be applied to any airbag devices which need to expand and deploy like a sheet.

Referring to FIGS. 15–26, there is shown a second embodiment of the present invention, which is substantially the same as the first embodiment.

Referring to FIGS. 16–18, an airbag main body 21 comprises a bag-like expansion part 27 obtained by placing one upon another an outside cloth 24 disposed outside or on the side of the vehicle body and an inside cloth 25 disposed on the side of the cabin 4 and sewing the two cloths together at a predetermined sewing area or junction 26 and for receiving inflow of gas for expansion and deployment, a gas inlet 28 located in the center of the upper portion of the airbag main body 21 to ensure communication between the expansion part 27 and the outside, and a sheet-like non-expansion part 29 which receives no gas inflow and thus has no expansion and deployment. In this embodiment, the outside cloth 24 and the inside cloth 25 are formed integrally by folding a single cloth or main panel along a folding line 30. Thus, the non-expansion part 29 located in the center of the lower portion of the airbag main body 21 is arranged with the inside cloth 25 being formed with a hole 25*a*.

The expansion part 27, which is an air chamber or hollow, comprises a communication 32 located in the center of the upper portion of the airbag main body 21 in the length direction thereof, a first expansion part or front-seat expansion compartment or front-seat restraining part or area 33 communicating with the front of the communication 32, a second expansion part of rear-seat expansion compartment or rear-seat restraining part or area 34 communicating with the back of the communication 32.

The sewing area 26 comprises an outer-peripheral sewing part or connection 76 for sewing the outer periphery of the expansion part 27, and at least one restriction 77 for restricting the width upon deployment of the expansion compartments 33, 34. The at least one restriction 77 is located in one spot or spots in the expansion part 27, and is formed integrally or differently from the outer-peripheral sewing part 76. In this embodiment, the at least one restriction 77 is formed annularly and independent from the outer-peripheral sewing part 76.

Provided between the outside cloth 24 and the inside cloth by sewing or the like is a means for guiding gas or restricting the width of the expansion part 27 upon deployment, which comprises an inner pipe 71, a front partition 72, and a rear partition 73.

The inner pipe 71, which serves to guide gas and protect the outside cloth 24 and the inside cloth 25 from heat of gas or the like, is formed by folding a single cloth and sewn integrally to the outer-peripheral sewing part 76 for mounting to the main panel. The inner pipe 71 has an opening 45 formed at the upper side to communicate with the gas inlet 28, and first and second spouts 46, 47 formed at the front and back to communicate with the opening. Then, gas introduced through the gas inlet 28 is guided by the inner pipe 71 located in the communication 32, and is distributed thereby to the front-seat expansion compartment 33 and the rear-seat expansion compartment 34.

The front partition 72 and the rear partition 73, which serve to guide gas and restrict the width of the expansion part 27 upon deployment, are each formed roughly rectangularly out of a single cloth, and have a circular communication hole 48 along the length direction and at predetermined intervals. The front partition 72 has both sides in the length direction mounted to the outside cloth 24 and the inside cloth 25 by sewing or the like so as to partition the front-seat expansion compartment 33 into upper and lower sections. The rear partition 73 has both sides in the length direction mounted to the outside cloth 24 and the inside cloth 25 by sewing or the like so as to partition the rear-seat expansion compartment 34 into upper and lower sections.

A plurality of lugs 82 is formed with the airbag main body 21 at the front end to be available when inserting the folded airbag 1 into a cover member.

Figure 21:
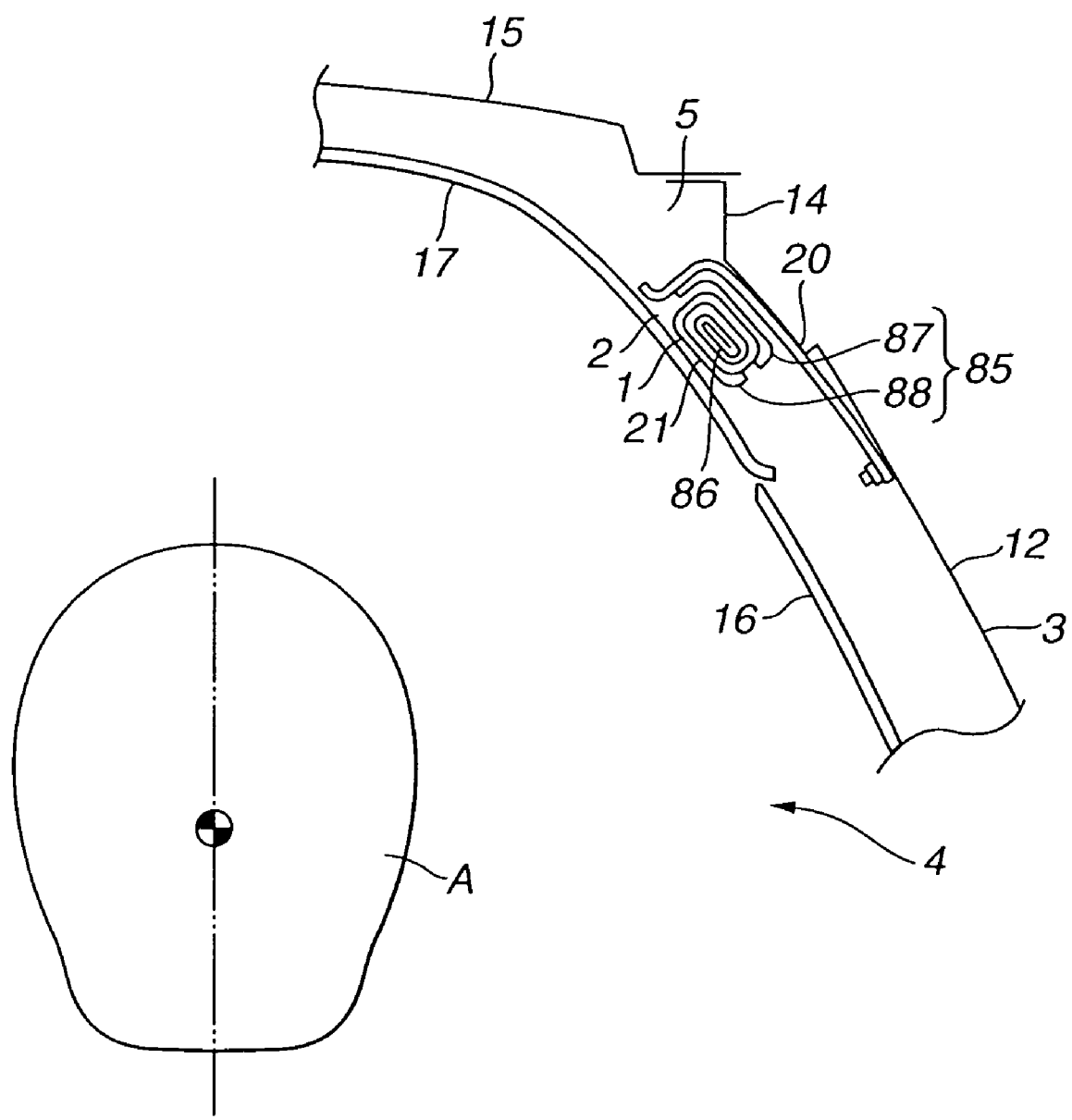

Next, the folded condition of the airbag 1 is described. Referring to FIGS. 15 and 21, the airbag 1 is folded in a shape having, principally, a duct part 85 and an aggregative part or third fold 86. The duct part 85 is set to be in a position including the gas inlet 28, the communication 32, and part of the front and rear expansion compartments 33, 34 (in this embodiment, in a position including an airbag portion above the partitions 72, 73). The duct part 85 comprises along the length direction a first fold or arm 87 located on the side of the gas inlet 28 or in the upper position, and a second fold or arm 88 located on the side of the aggregative part 86 or in the lower position with respect to the first fold 87. Making consideration in connection with gas supplied to the expansion part 27, gas introduced through the gas inlet 28 is supplied to the first fold 87, the second fold 88, and the third fold 86 in this order.

Referring to FIG. 15, the first fold 87, which corresponds to an area of the base end ranging from point P1 to point P2, includes a non-expanding portion, and directly communicates with the gas inlet 28. The first fold 87 is arranged to extend outward of the cabin 4 like an arm, and is folded like a plate as crushed flat from top and bottom.

The second fold 88, which corresponds to an area of the base end ranging from point P2 to point P3 as shown in FIG. 15, is arranged to extend inward of the cabin 4, and is folded like a plate as crushed flat from top and bottom.

The aggregative part 86, which corresponds to an area of the base end ranging from point P3 to point P4 as shown in FIG. 15 and, principally, part of the front-seat expansion compartment 33 and the rear-seat expansion compartment 34, is wound from the lower end in a predetermined direction or folded like a roll. Note that the predetermined direction is a direction of the rewinding aggregative part 86 along windows 8. By way of example, the airbag 1 mounted on the left side as viewed from the front is wound counterclockwise from the lower end as shown in FIG. 15.

The first and second folds 87, 88 are disposed to surround the aggregative part 86 from above, wherein the first fold 87 is located on the outer side of the aggregative part 86 or on the side of the vehicle body, and the second fold 88 is located on the inner side of the aggregative part 86 or on the side of the cabin 4. The first and second folds 87, 88 are folded roughly like a parasol in their entirety.

FIGS. 21–25 show airbag device 2 and occupant A as seen from the back of the vehicle 3. With the airbag device 2, upon side collision of the vehicle 3 and the like, the inflator is actuated by the unillustrated control unit to inject gas, which is introduced into the airbag 1 through the gas inlet 28 to expand the expansion part 27. Deforming the head lining 17 and the like, the airbag 1 quickly protrudes downward from the roof side 5 for expansion and deployment to cover the front and rear windows 8 like a curtain, achieving restraint of the head and chest of the occupants seated in the front and rear seats.

Figure 22:
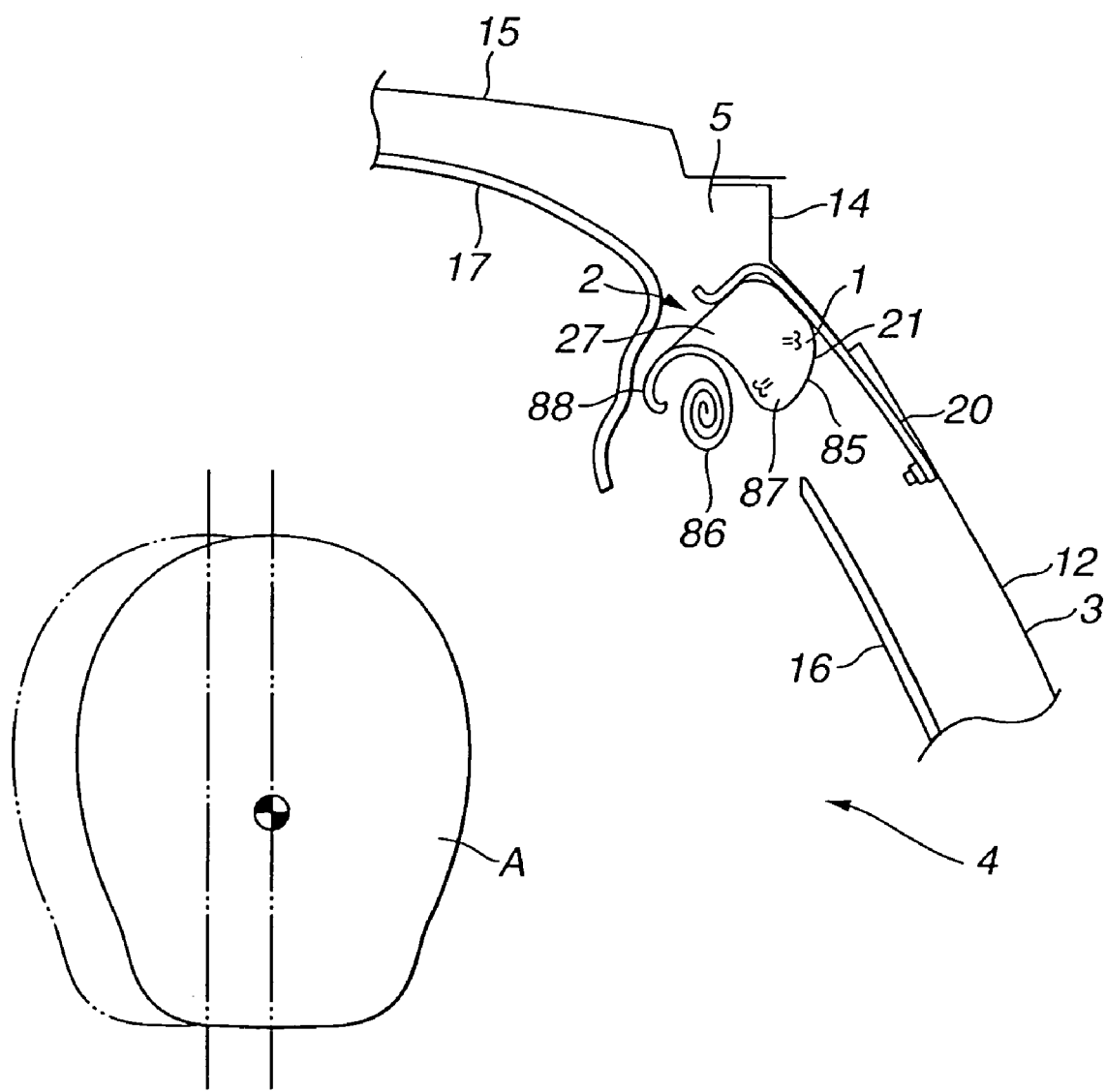

The deployment of the airbag 1 is described in detail. In the state as shown in FIG. 21, when gas is introduced into the airbag 1 through the gas inlet 28, gas is supplied to the expansion part 27 located at the first fold 87, deploying the first fold 87 as shown in FIG. 22. Then, the first fold 87 as deployed pushes and moves other portions of the airbag 1 such as aggregative part 86 toward the cabin 4, and also pushes and deforms the head lining 17, securing the projecting opening of the airbag 1.

Figure 23:
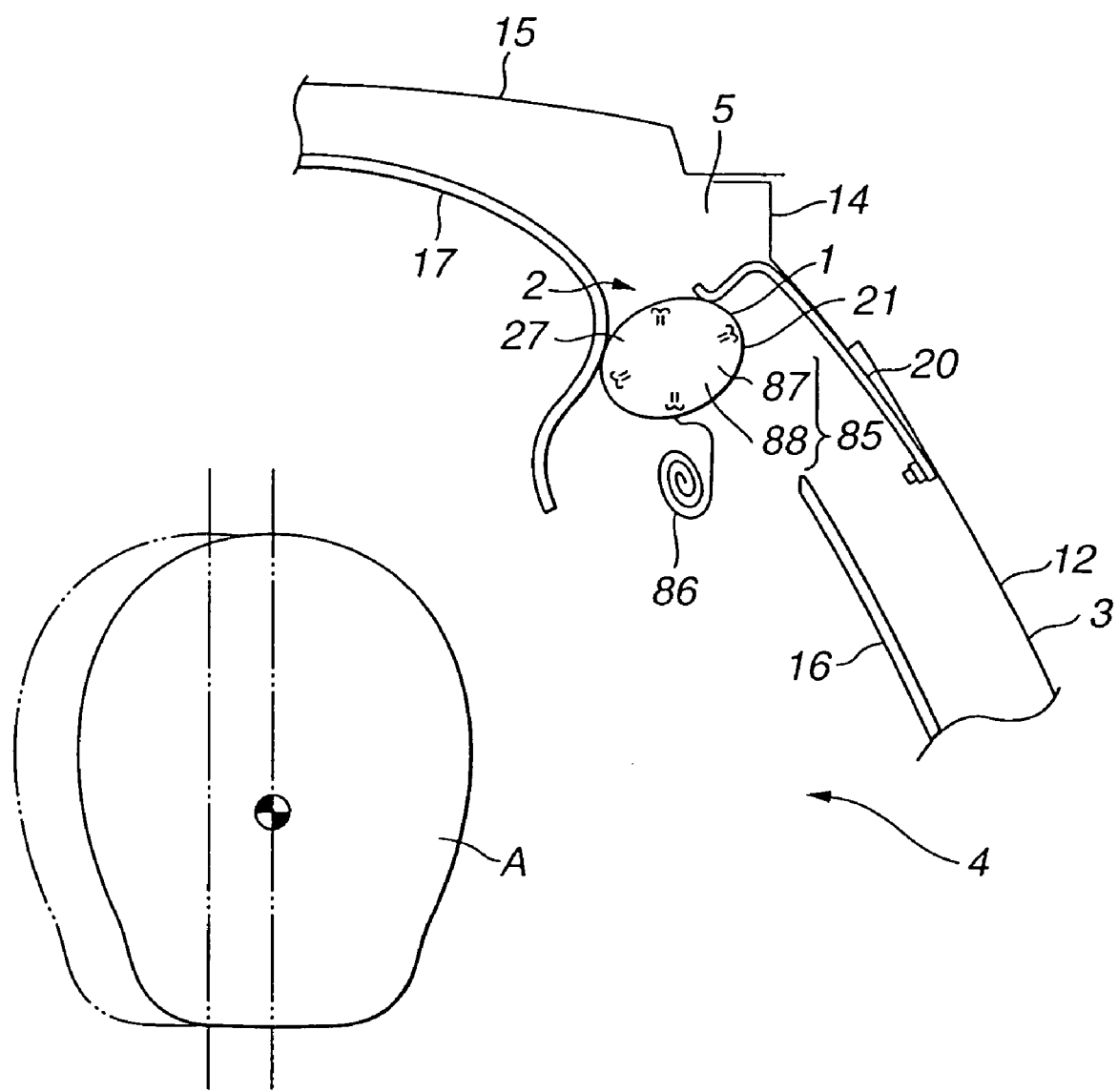

Subsequently, gas is supplied to the expansion part 27 located at the second fold 88 as shown in FIG. 23, deploying the second fold 88. Then, the second fold 88 as deployed further pushes and deforms the head lining 17, securing the projecting opening of the airbag 1. At the same time, the duct part 85 is in deployment to guide and push the aggregative part 86 downward.

Figure 24:
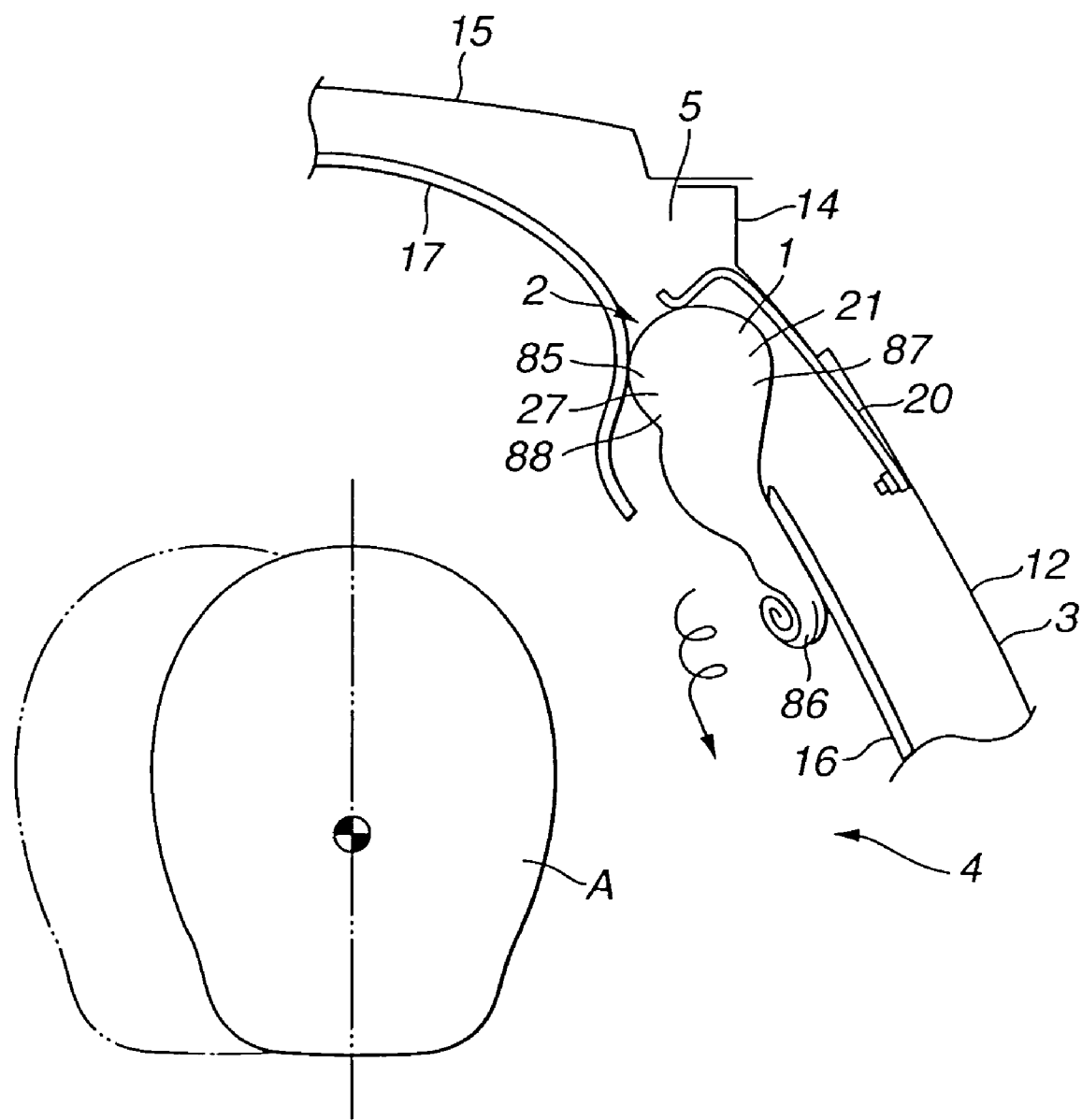
Figure 25:
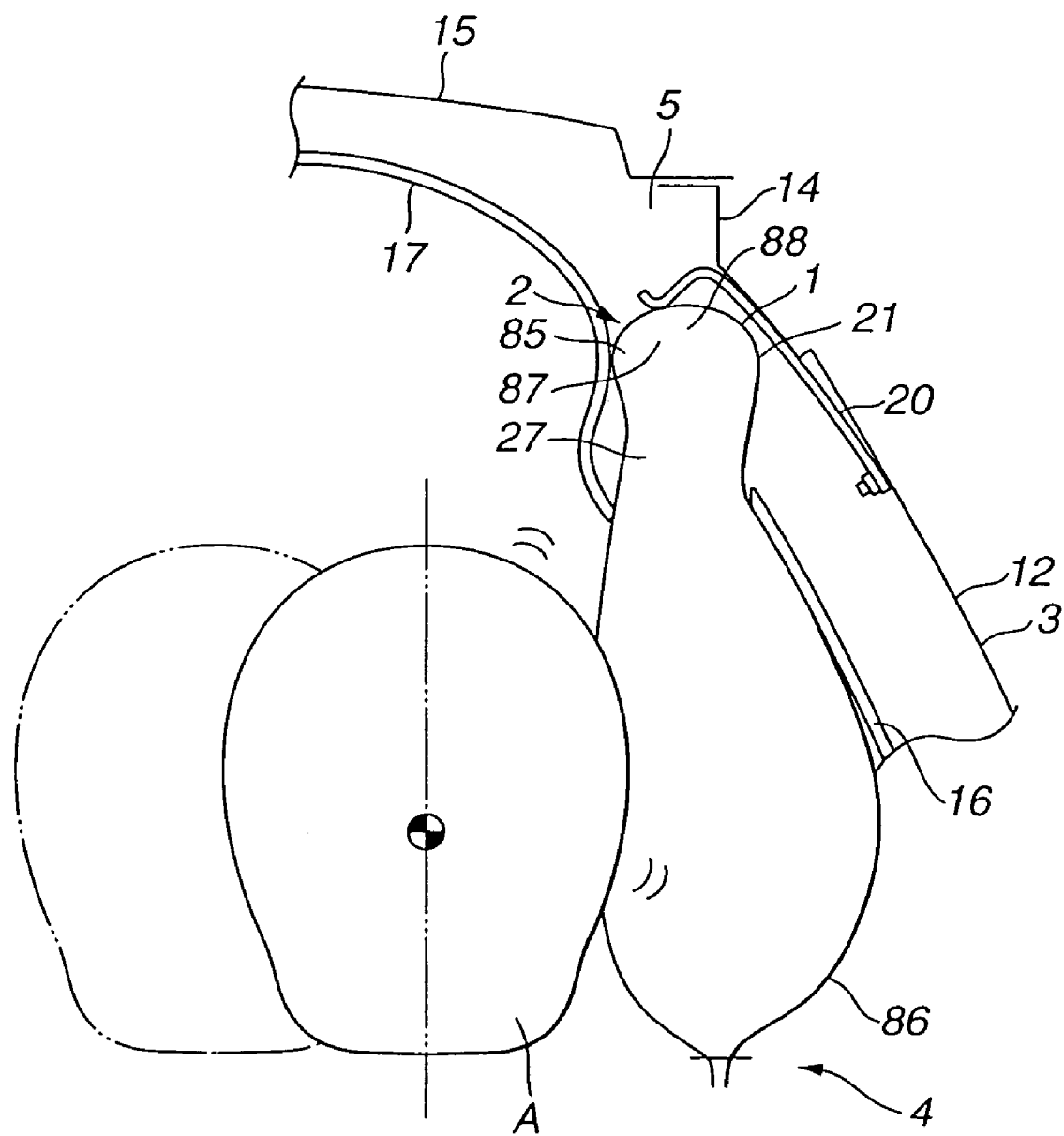

After deployment of the duct part 85, the aggregative part 86 starts to deploy as shown in FIG. 24. This is because the aggregative part 86 folded like a roll is greater in gas-flow resistance upon deployment than the duct part 85 folded in a simply crushing way. The aggregative part 86 deploys downward in a rolling way along the surface of the windows 8 or that of the B-pillar 12, completing deployment as shown in FIGS. 20 and 25, thus achieving restraint of the head of the occupant A.

In such a way, in this embodiment, when introducing gas into the airbag 1 through the gas inlet 28, the duct part 85 deploys first to achieve quick deployment of the first fold 87 and the second fold 88, and then the aggregative part 86 deploys, so that the aggregative part 86 can be guided by the first and second folds 87, 88 as deployed first to obtain stable and smooth deployment in a desired direction from a desired position, allowing stable and smooth deployment of the airbag 1 between the side face of the cabin 4 and the occupant A in the cabin 4.

Specifically, first, the first fold 87 or the upper portion of the duct part 85 deploys to push the aggregative part 86 as folded airbag 1 toward the cabin 4, pushing open the trims such as head lining 17, thus securing the projecting opening of the airbag 1 and allowing the aggregative part 86 to be moved to a desired deployment start position distant from the windows 8 and the like.

Then, the second fold 88 or the lower portion of the duct part 85 exposed on the side of the occupant A deploys to allow pushing-out of the aggregative part 86 as non-expanded from the trims such as head lining 17.

Although the trims such as pillar garnish 16 of the B-pillar 12, for example, have a level difference such as support 79 of the seat belt, the aggregative part 86 moved inward of the cabin 4 with respect to such level difference can deploy stably and smoothly without being affected by the trims, i.e. without being caught on the pillars 11–13 and the like.

In the conventional airbag structure having occupant-side and door-side portions asymmetrically folded with respect to the deployment path line, the airbag behavior is difficult to stabilize as being greatly affected by the direction of deployment of the duct part. On the other hand, in the airbag structure in this embodiment, smooth and quick deployment of the airbag 1 can be obtained.

Further, since the aggregative part 86 is folded like a roll from the lower end so that the roll points to the occupant A, the aggregative part 86 can smoothly deploy without any resistance downward from above in a rolling way along the surface of the windows 8 or that of the B-pillar 12, resulting in stable and smooth deployment of the airbag 1.

Still further, by introducing gas into the communication 32 between the front-seat expansion compartment 33 and the rear-seat expansion compartment 34 as in this embodiment, the airbag 1 having greater length can easily be adjusted in the deployment balance in the length direction, resulting in stable and quick covering of the front and rear windows 8 with the airbag 1.

Furthermore, the airbag 1 is simple in the folding shape, facilitating folding of the airbag 1, resulting in easy operation process and thus reduced manufacturing cost. Particularly, with the so-called curtain airbag which deploys from the roof side 5 and is of the type which receives gas from the middle between the front-seat expansion compartment 33 and the rear-seat expansion compartment 34, the duct part 85 which receives gas in the initial stage is not always formed in a straight line, but in a complicated shape such as curve. Even if the duct part 85 is in a complicated shape, easy folding of the airbag 1 can be ensured.

Note that the airbag structure in the second embodiment can be applied to that in the first embodiment as shown in FIG. 3.

Further, in the embodiment, the aggregative part 86 may be folded like a bellows in place of a roll.

Still further, the sewing area 26 can have a sealing material applied thereon to laminate the cloths and the sealing material like a sandwich, preventing or restraining gas leakage between thread and cloth, thus achieving enhanced gastightness.

In the embodiment, the airbag 1 is applied to the airbag device 2 for covering the side windows 8 of the vehicle 3. Optionally, the airbag 1 can be applied to any airbag devices which need to expand and deploy like a sheet.

By way of example, referring to FIG. 26, the airbag 1 folded in the above shape can be accommodated in the pillar garnish 16 of the B-pillar 12 perpendicularly along the length direction to deploy forward of the vehicle 3 along the front window 8 as indicated by line B. Alternatively, the airbag 1 can be accommodated in the C-pillar 13 slantly along the length direction to deploy forward and downward of the vehicle 3 along the rear window 8 as indicated by line C for restraint of the head of the rear-seat occupant A.

Referring to FIGS. 27–45, there is shown a third embodiment of the present invention, which is involved in a method and system for folding the airbag 1 of the present invention.

Referring to FIG. 27, a system 101 for folding the airbag 1 is described. The folding system 101 comprises a main-body box 102 arranged on the floor and a table 111 fixed on the main-body box 102 and having the top face which serves as a mounting face 110. Accommodated in the main-body box 102 are a control means such as ECU and a drive means such as cylinder and motor, not shown. A console 114 is mounted to the main-body box 102 at the frontward position as viewed from an operator, and is provided with an operation means 115. The operation means 115 comprises a plurality of switches 115a–115f. Sensor devices 118 comprising a photoelectric sensor are oppositely disposed at both ends of the main-body box 102 in the length direction, and are constructed to stop operation of the folding system 101 when any object lies between the sensor devices 118.

The table 111 is formed with an accommodation 121 located at the back or at a position backward of the center in the width direction. The accommodation 121 extends continuously along the length direction of the table 111, and is formed by recessing downward the surface of the table 111 in a predetermined dimension, i.e. like a so-called U-slot, to allow lengthwise accommodation of the folded airbag 1. A pair of jig receivers 123 is provided to the main-body box 102 at both ends of the accommodation 121.

A concave 125 is formed in the table 111 at the frontward position. The concave 125 extends discontinuously along the length direction of the table 111, and is formed by recessing downward the surface of the table 111 in a predetermined dimension. Arranged in the concave 125 is a plurality of (four, in this embodiment) saber or jig receivers 126. The saber receivers 126 are formed with so-called U-slots 127 located in line and obtained by recessing downward the surface of the table 111.

A plurality of (five, in this embodiment) locate pins 131 is arranged on the table 111 at a position backward of the accommodation 121. The locate pins 131 are controlled by the control means to protrude and withdraw from the mounting face 110 of the table 111.

A plurality of (four, in this embodiment) rectangular recesses 133 is arranged in the surface of the table 111 between the accommodation 121 and the concave 125.

A plurality of (four, in this embodiment) first folding means 141 is provided to the main-body box 102 at a position backward of the table 111. Each first folding means 141 comprises a first restriction plate or slide plate 142 and a drive means for driving the first restriction plate 142. The first restriction plate 142 is disposed opposite to the mounting face 110 of the table 111, and is controlled by the control means to move both in the vertical direction and in the width direction or cross direction of the table 111. Specifically, the first restriction plate 142 moves from one side of the table 111 to another side and along the surface of the airbag 1 disposed on the mounting face 110 so as to overlap with part of an edge of the airbag 1 including expansion part 27 communicating with the gas inlet 28. The two first restriction plates 142 at both ends of the table 111 are greater in width than the other two, and are formed with a recess 143 extending backward.

A plurality of (four, in this embodiment) retaining means or fold holding means 145 is provided to the main-body box 102 at a position backward of the table 111. Each restraining means 145 comprises a rod 146 arranged adjacent to the first folding means 141 and a restrainer 147 mounted to the rod 146 at the upper end. The restrainer 147 is disposed opposite to the mounting face 110 of the table 111, and is controlled by the control means to rotate in the horizontal direction and move in the vertical direction.

A second folding means 151 is arranged in the recess 133 of the table 111, and comprises a second restriction plate or slide plate 152 and a drive means for driving the second restriction plate 152. The second restriction plate 152 is disposed opposite to the mounting face 110 of the table 111, and is controlled by the control means to move both in the vertical direction and in the width direction of the table 111. More specifically, the second restriction plate 152 moves between a first position where it is received in the recess 133 and does not protrude upward from the mounting face 110 and a second position where it protrudes upward from the mounting face 110 and moves backward to be placed over or overlap with part of an edge of the first restriction plate 142.

Figure 35:
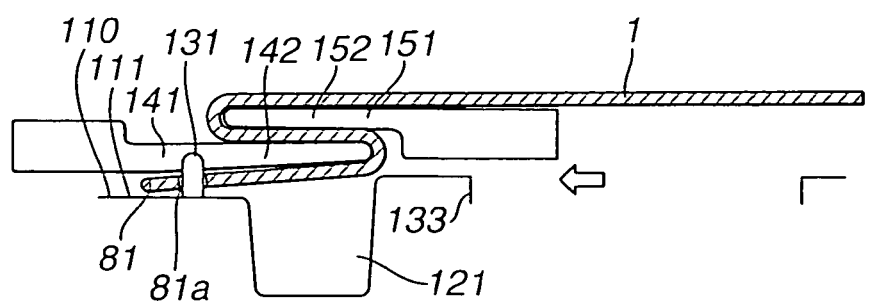

The second restriction plate 152 is reduced stepwise in depth so that the rear portion is smaller than the front portion as best seen in FIG. 32, and it is constructed to be placed over the first restriction plate 142 as shown in FIG. 35.

A plurality of (four, in this embodiment) slide-plate sets A, B, C, D each comprising first folding means 141, second folding means 151, and retaining means 145 is arranged along the length direction of the table 111.

As best seen in FIG. 29, the folding system 101 further comprises a saber or third-fold jig 161 which is a member separate and distinct from the main-body box 102. The saber 161 comprises a pair of long main bodies 162 and a pair of stops 163 mounted to the main-bodies 162 at both ends. Each saber main body 162 comprises a base plate 164 and edges 165 obtained by folding both sides of the base plate 164 along the length direction to have a C-shaped section. Each saber stop 163 is formed roughly cylindrically, and has both ends formed with an engagement or rectangular hole 167. When disposing the saber 161 on the saber receivers 126, the main bodies 162 are engaged with each other with the base plates 164 facing each other, both ends of which are press fitted into the engagements 167 of the saber stops 163, respectively, for integral assembling.

Figure 43:
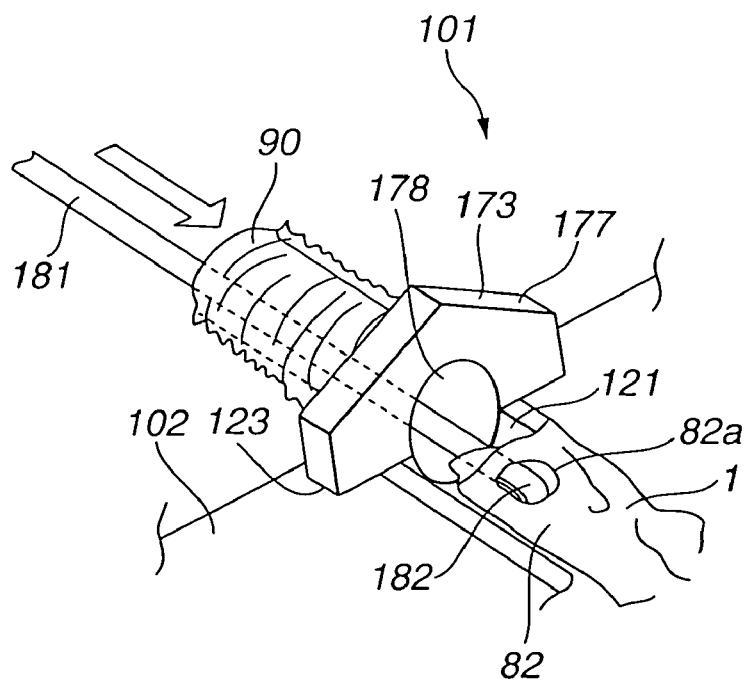
Figure 44:
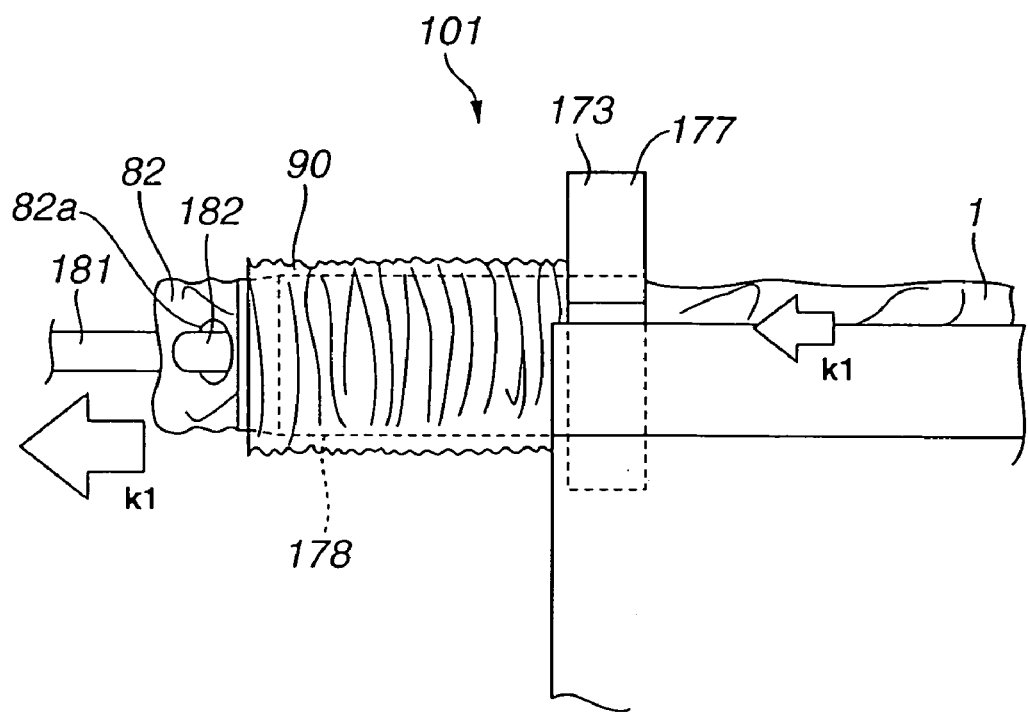

Referring to FIGS. 30 and 31, the folding system 101 comprises a sleeve mounting device or cover-member jig 171 as a member detachable from the jig receiver 123 of the main-body box 102. The sleeve mounting device 171 comprises a guide 172 and an insertion or cylindrical jig 173 engaged therewith. The guide 172 comprises a rectangular base plate 174, a guide rod 175 protruding from the guide 174 substantially in the center, and a pair of positioning pins 176 protruding from the base plate 174 in parallel with the guide rod 175. The guide rod 175 is formed cylindrically, and has at a front end a portion having tapered diameter or a taper portion 175a. The insertion 173 comprises a substantially pentagonal plate-like flange 177, a pipe 178 protruding from the flange 177, and a pair of circular positioning holes 179 formed in the flange 177 in the neighborhood of the pipe 178. The pipe 178 is formed cylindrically, and has taper portions 178a, 178b formed on the inner face of a base end and the outer face of a front end, respectively, and having tapered diameter. When assembling the guide 172 and the insertion 173, the guide rod 175 is inserted into the pipe 178 to have the positioning pin 176 engaged with the positioning hole 179, then obtaining the flange 177 placed on the guide base plate 174. The base plate 174 of the guide 172 is fixed to a workbench, not shown. Referring to FIG. 43, the sleeve mounting device 171 further comprises a hook or pulling jig 181, which is formed like a long bar and has a crook 182 at the front end.

Referring next to FIGS. 32–39, the process of folding the airbag 1, i.e. operation of the folding system 101, is described. Note that the description is made about operation in the slide-plate set B as shown in FIG. 27, which is the same in the other slide-plate sets A, C, D as well.

Generally, the folding process comprises a step of spreading and placing the airbag 1 flat; a step of forming a first fold 87 by folding part of the edge of the airbag 1 including expansion part 27 communicating with the gas inlet 28 to have a J-shaped section; a step of forming a second fold 88 by folding part of the rest of the airbag 1 continuously connected to the above part to have an inverted J-shaped section; a step of forming a third fold or aggregative part 86 by aggregating the rest of the airbag 1 excluding the above part and rest part; and a step of locating the aggregative part 86 between the first fold 87 and the second fold 88.

Referring to FIG. 32, in the initial state, the first restriction plate 142 of the first folding means 141 is withdrawn backwards the retainer 147 of the retaining means 145 is withdrawn upward and in a predetermined rotation position, the second restriction plate 152 of the second folding means 151 is withdrawn downward, and the locate pin 131 protrudes upward from the mounting face of the table 111.

In a preparatory step, through holes 81a of mounting pieces 81 of the airbag 1 in part or in entirety are caught to the locate pins 131 for fixing, and the airbag 1 is spread flat on the mounting face 110 of the table 111.

Figure 33:
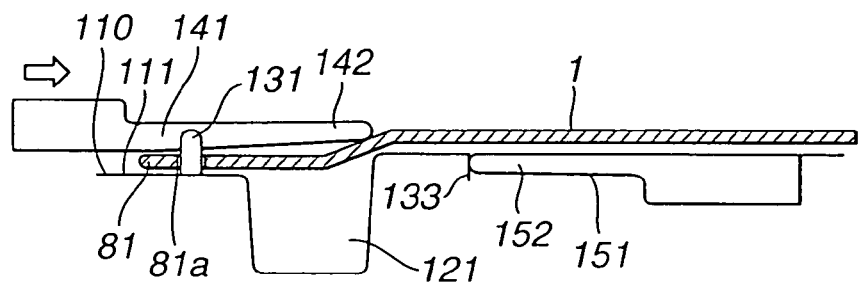

Referring to FIG. 33, in a subsequent step, the operation means 115 is actuated to move the first restriction plate 142 forward, which is thus located above the airbag 1 in a position where the first fold 87 is to be formed. Note that the position of the first restriction plate 142 lies above the accommodation 121.

Figure 34:
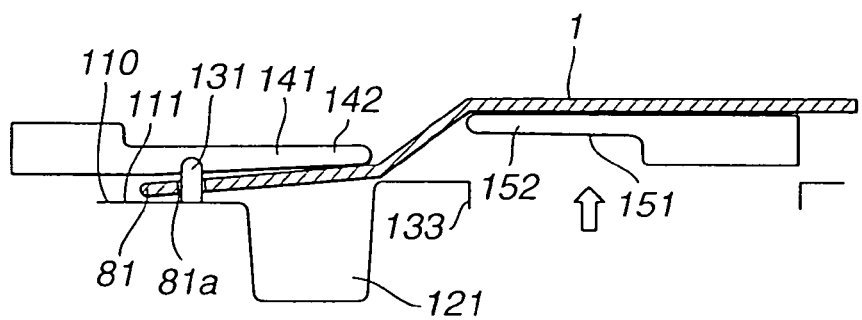

Referring to FIG. 34, in a subsequent step, the operation means 115 is actuated to move the second restriction plate 152 upward.

Referring to FIG. 35, in a subsequent step, the operation means 115 is actuated to move the second restriction plate 152 backward, forming the first fold 87 and the second fold 88 of the airbag 1 at the same time.

Figure 36:
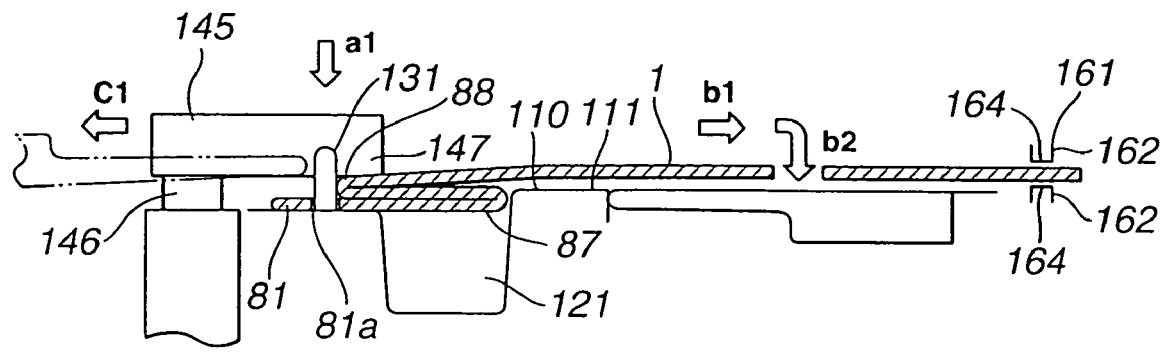

Referring to FIG. 36, in a subsequent step, the operation means 115 is actuated to rotate the retainer 147 by 90° and move it downward as indicated by arrow a1, pressing the rear portions of the first fold 87 and the second fold 88 against the mounting face 110 for shape maintaining. Part of the through holes 81a of the mounting pieces 81 of the airbag 1 are caught additionally to the locate pins 131 as required.

Then, the second restriction plate 152 is moved backward as indicated by arrow b1, and is moved downward as indicated by arrow b2, whereas the first restriction plate 142 is moved backward as indicated by arrow c1, removing the first restriction plate 142 and the second restriction plate 152 from the airbag 1.

Then, the saber 161 is mounted to the airbag 1 along the edge. Specifically, the airbag 1 is held between the base plates 164 of the saber main bodies 162 to press fit both ends of the main bodies 162 into the engagements 167 of the saber stops 163, maintaining the hold state. And the saber 161 is disposed on the saber receivers 126.

Figure 37:
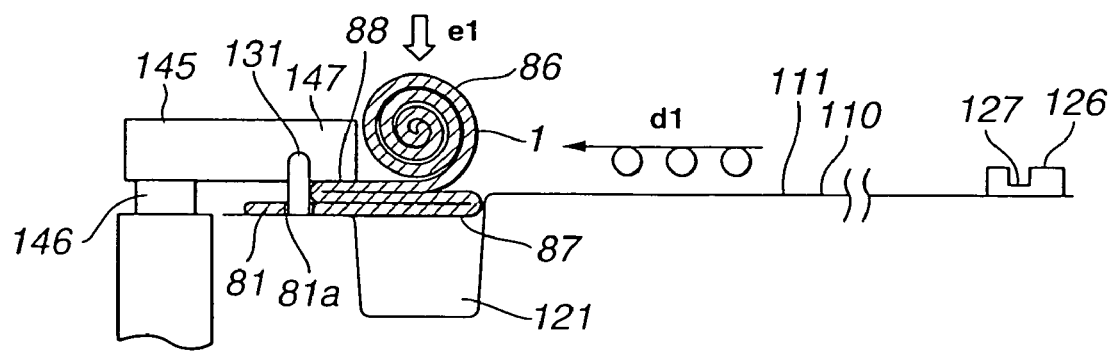
Figure 38:
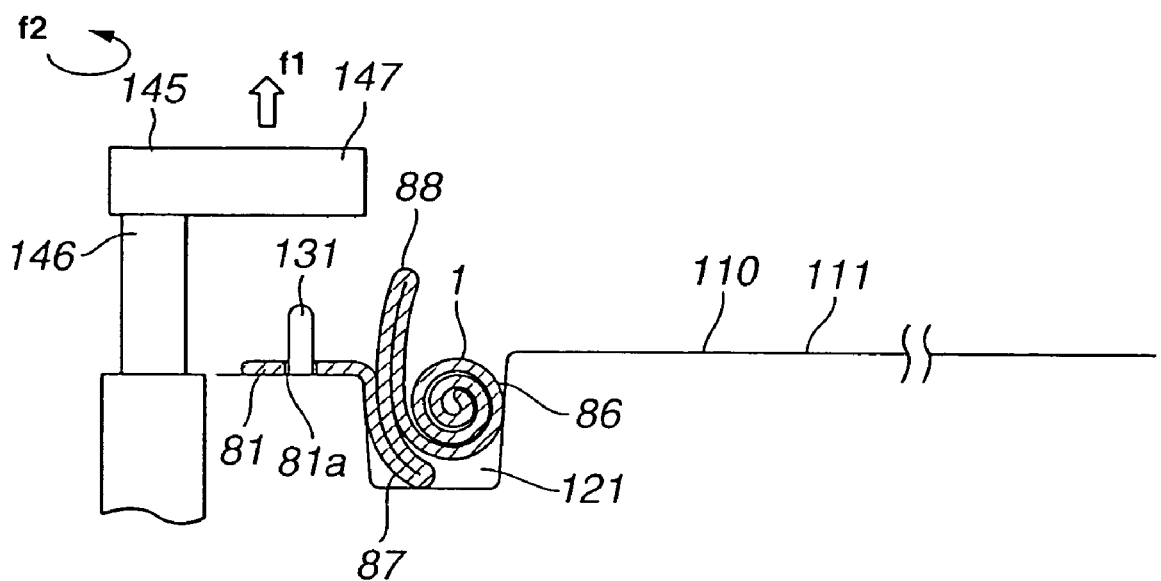

In a subsequent step, a portion of the airbag 1 extending from the second fold 88 is aggregated automatically or manually to form the aggregative part 86. Referring to FIG. 37, in this step, the airbag 1 is rolled on the mounting face 110 backward as indicated by arrow d1 in a winding way with the saber 161 as axis, forming the rolled aggregative part 86. Winding operation is carried out manually in this embodiment. Alternatively, it can be carried out electrically using a motor and the like. Note that FIG. 37 shows no saber 161 for simplification.

In a subsequent step, the aggregative part 86 together with the first fold 87 is dropped into the accommodation 121 as indicated by arrow e1 in FIG. 37. The accommodation 121 allows restraint of the outline or preservation of the shape with the first fold 87 extending along the lower or one side of the aggregative part 86. Then, the saber stop 163 is disengaged from one end of the saber 161 to remove the saber 161 from another end along the length direction. Then, referring to FIG. 38, the operation means 115 is actuated to move the retainer 147 upward as indicated by arrow f1 and rotate it by 90° as indicated by arrow f2, releasing restraint of the airbag 1 by the retainer 147.

The shape of the airbag 1 is put in order manually to extend along the accommodation 121 as required.

Figure 39:
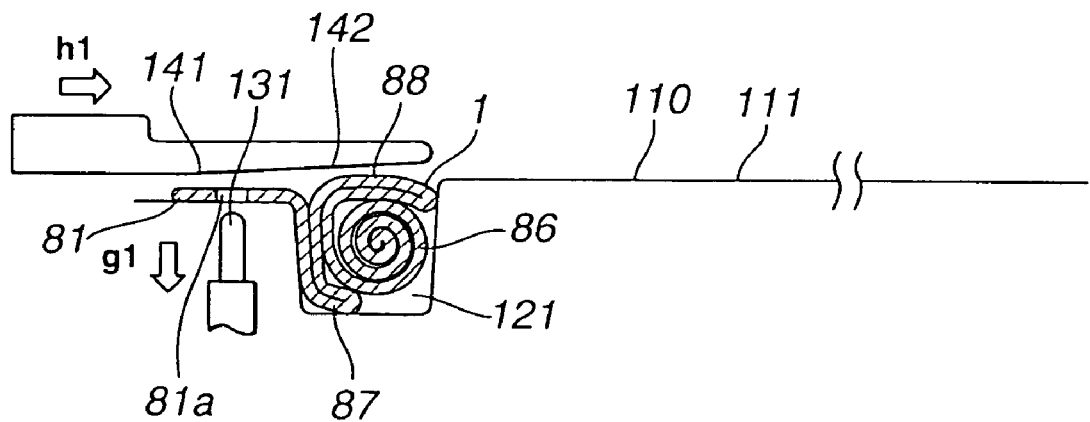

Referring to FIG. 39, in a subsequent step, the operation means 115 is actuated to move the locate pin 131 downward as indicated by arrow g1 and move the first restriction plate 142 forward as indicated by arrow h1. Then, the first restriction plate 142 puts the second fold 88 to extend along the upper or another side of the aggregative part 86.

The shape of the airbag 1 is put in order manually to extend along the accommodation 121 as required. Specifically, using a space between the two adjacent first restriction plates 142 or the recess 143 of the first restriction plate 142, the second fold 88 is pushed into the accommodation 121.

After this step, the saber 161 can be disengaged from the airbag 1.

Referring next to FIGS. 40–45, the process of accommodating the folded airbag 1 in the sleeve 90 by using the sleeve mounting device 171.

Generally, the accommodating process is involved in a method of manufacturing the airbag device 2 wherein the airbag 1 having gas inlet 28 for receiving gas and expansion part 27 communicating with the gas inlet 28 is accommodated in the sleeve or cloth cylinder 90 wherein the airbag 1 comprises mounting piece 81, and the sleeve 90 comprises a slit 90a through which the mounting piece 81 can be pulled out, the method comprising a step of putting the sleeve 90 on the insertion or insertion cylinder 173 and compressing the sleeve 90; a step of putting the folded airbag 1 into the insertion 173; and a step of passing the airbag 1 through the insertion 173, feeding the sleeve 90 from the insertion 173 to the airbag 1, and supplying the sleeve 90 in the length direction of the airbag 1 while withdrawing the mounting piece 81 through the slit 90a, thus achieving covering.

Figure 40:
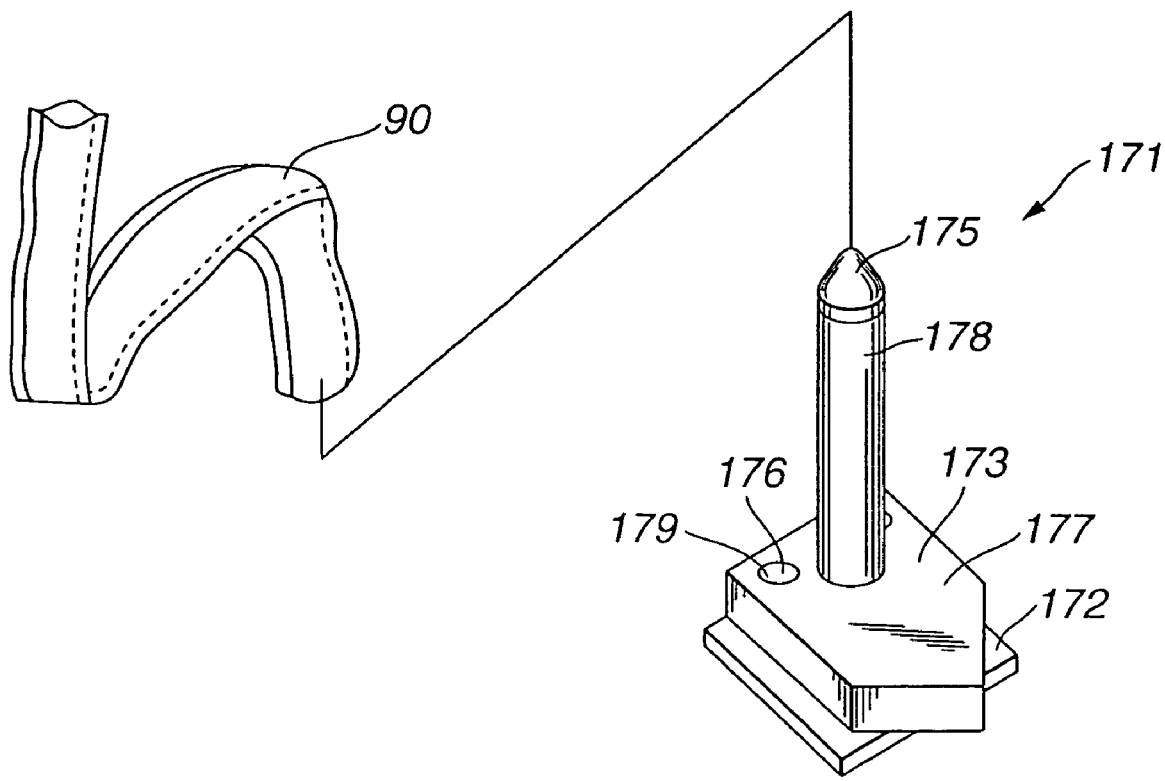

Referring to FIG. 40, in a first step, the guide 172 and the insertion 173 are assembled together, and the sleeve mounting device 171 is detached from the main-body box 102. As shown in the right half in FIG. 31, the sleeve 90 is put from one end on the outer periphery of the pipe 178 using the taper portion 175a at the front end of the guide rod 175. And by making crinkle, the sleeve 90 is aggregated to the flange 177 to put the overall sleeve 90 on the pipe 178 as shown in the left half in FIG. 31. In this state, the length of the sleeve 90 is 35 cm, for example.

Figure 41:
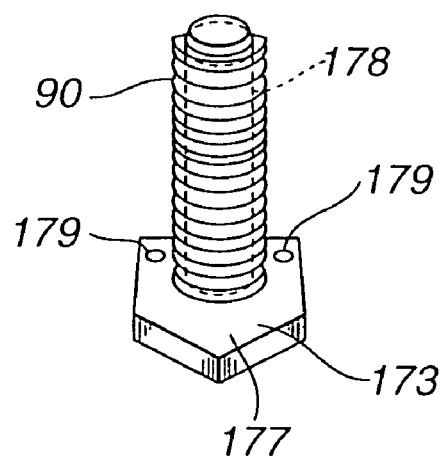

Then, referring to FIG. 41, the sleeve 90 together with the insertion 173 is removed from the guide 172.

Figure 42:
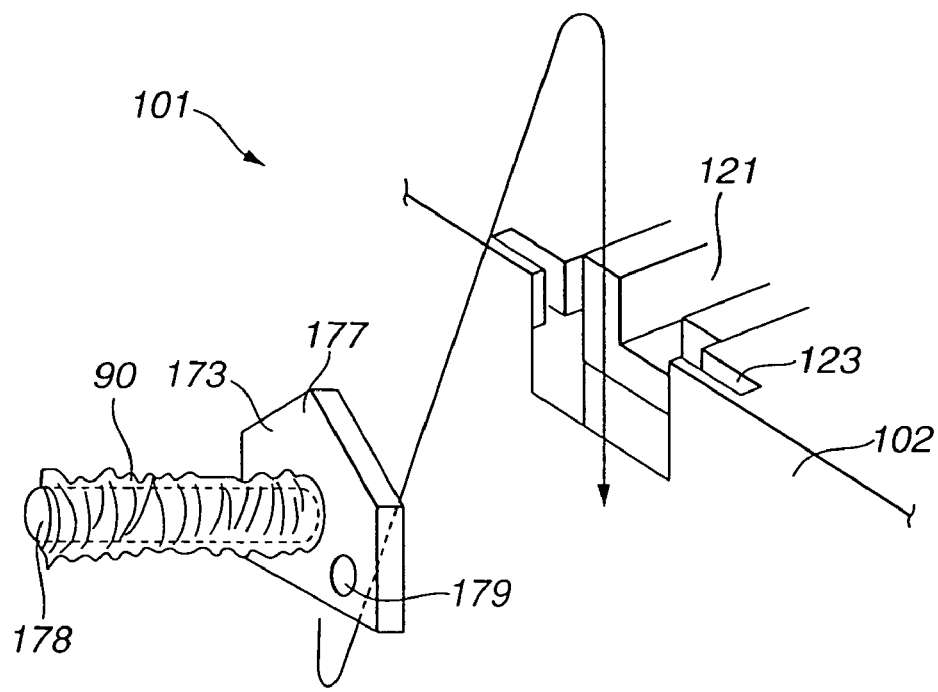

Referring to FIG. 42, in a subsequent step, the flange 177 of the insertion 173 is engaged with and mounted to the jig receiver 123 of the main-body box 102. In this state, the pipe 178 and the accommodation 121 coincide with each other, i.e. the airbag 1 accommodated in the accommodation 121 is visible through an axial hollow of the pipe 178.

In a subsequent step, a tension strap 22 (see FIG. 45) of the folded airbag 1 is withdrawn from one end through the pipe 178. Then, the hook 181 is inserted from the front end through the pipe 178 to catch the crook 182 in the through hole 82a of the mounting piece 82 as shown in FIG. 43, withdrawing the airbag 1 from the opening at the base end of the pipe 178 to the opening at the front end as indicated by arrow k1 in FIG. 44.

Figure 45:
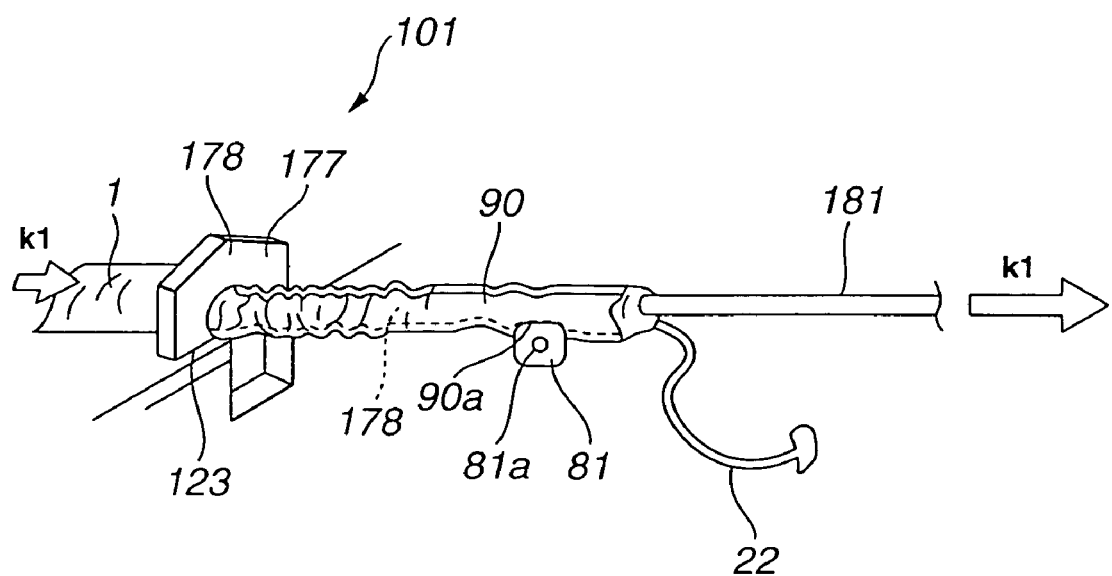

In this step, the airbag 1 is withdrawn not in one stroke, but in such a way that the mounting pieces 81 are drawn outside from the pipe 178 one after another while correcting positional deviation L between the slit 90a of the sleeve 90 and the mounting piece 81 as shown in FIG. 28 and aligning the mounting pieces 81 accurately so as not to produce deviation of the mounting pieces 81 in the direction of rotation, i.e. twist of the airbag 1. At the same time, the sleeve 90 is fed or supplied little by little in the direction of arrow k1. And the alignment is carried out between the slit 90a of the sleeve 90 and the mounting piece 81 to pull out the mounting piece 81 through the slit 90a as shown in FIG. 45. Subsequently, the airbag 1 and the sleeve 90 are withdrawn further to successively pull out the other mounting pieces 81 and an airbag portion including gas inlet 28 through the corresponding slits 90a. Withdrawing the airbag 1 and the sleeve 90 little by little allows the airbag 1 to be achieved with desired folding shape and outline preserved by the sleeve 90 and without any local slack and tension. Note that when withdrawn in one stroke, the resultant airbag 1 is difficult to correct slack and tension.

And by actuating the operation means 115, the locate pin 131 is returned to a home position where it protrudes upward, i.e. an initial state as shown in FIG. 32.

In such a way, in this embodiment, the airbag 1 having greater length and to which narrow and compact folding capability is demanded can easily be folded in a predetermined shape having first to third folds 86–88, resulting in reduction in manufacturing cost. With the airbag 1 of the type which receives gas from the duct part or middle 85 between the front-seat expansion compartment 33 and the rear-seat expansion compartment 34, the airbag 1 even with greater length can easily be adjusted in deployment balance in the length direction to allow stable and quick covering of the front and rear windows 8. However, the duct part 85 which receives gas in the initial stage may be in complicated shape. On the other hand, in this embodiment, even when the duct part 85 is in complicated shape, the airbag 1 can be folded easily, resulting in a reduction in manufacturing cost of the airbag device 2.

Specifically, once the airbag 1 is spread on the mounting face 110 of the table 111, the first fold 87 and the second fold 88 can be formed by the first folding means 141 and the second folding means 151. Then, by forming the aggregative part 86 by an appropriate means, the airbag 1 can easily be folded in a predetermined shape, leading to a reduction in working cost. Moreover, the first folding means 141 and the second folding means 151 comprise first restriction plate 142 movable roughly along the mounting face 110 and second restriction plate 152 movable in such a way as to overlap with the first restriction plate 142, allowing folding of the first fold 87 and the second fold 88 by the simple structure, leading to a reduction in manufacturing cost of the folding system 101.

After folding, the first fold 87 and the second fold 88 can be maintained in shape by the retaining means 145, facilitating operation even when the aggregative part 86 is formed manually.

Since the slot-like accommodation 121 is formed in the mounting face 110 of the table 111 in a predetermined position, accommodating the folded aggregative part 86 together with the first fold 87 in the accommodation 121 allows the aggregative part 86 to be maintained in shape. Then, by putting the second fold 88 to extend along the aggregative part 86, the airbag 1 can be folded easily.

In the folding process, application of an excessive force to the airbag 1 is not required, having no need of increasing the strength of the cloths forming the airbag 1, resulting in small-sized folding of the airbag 1 for accommodation.

Further, in this embodiment, the use of the insertion 173 allows the airbag 1 having greater length and folded in narrow and small-sized shape to be aligned easily accurately in the direction of rotation and covered with the sleeve 90. With this, the mounting piece 81 and the airbag portion including gas inlet 28 can be pulled out from the slit 90a of the sleeve 90, resulting in a reduction in working cost.

The insertion 173 is disposed along the length direction of the accommodation 121 in which the airbag 1 folded in narrow shape is accommodated. This allows folding operation of the airbag 1 smoothly followed by covering operation of the sleeve 90, resulting in a reduction in working cost.

Furthermore, the airbag 1 roughly throughout the length can be covered with the sleeve 90. This structure allows, as compared with the structure wherein the airbag 1 is bound at a plurality of spots with cord-like members, the shape of the folded airbag 1 to be preserved throughout the length, leading to facilitated operation process such as assembling to the vehicles and reduced operation man-hours and thus working cost. Moreover, since the airbag 1 roughly throughout the length can be covered with the sleeve 90, easy and uniform deployment of the airbag 1 can be obtained when supplying gas to the airbag 1.

In this embodiment, the aggregative part 86 is folded manually like a roll. Optionally, it may be folded automatically like waves.

Referring to FIGS. 46–53, there is shown a fourth embodiment of the present invention, which is involved in a system for folding the airbag 1, which has substantially the same structure as that of the system as described in the third embodiment.

Referring to FIG. 46, the folding system 101 comprises a main-body box 102 arranged on the floor and a table 111 fixed on the main-body box 102 and having the top face which serves as a mounting face 110. Accommodated in the main-body box 102 are a control means and a drive means. A console 114 is mounted to the main-body box 102 at the frontward position as viewed from an operator, and is provided with an operation means 115 which comprises a plurality of switches. Sensor devices 118 comprising a photoelectric sensor are oppositely disposed at both ends of the main-body box 102 in the length direction, and are constructed to stop operation of the folding system 101 when any object lies between the sensor devices 118.

The table 111 is formed with an accommodation 121 located at the back or at a position backward of the center in the width direction. The accommodation 121 extends continuously along the length direction of the table 111, and is formed by recessing downward the surface of the table 111 in a predetermined dimension, i.e. like a so-called L-slot, to allow lengthwise accommodation of the folded airbag 1. A pair of jig receivers 123 is provided to the main-body box 102 at both ends of the accommodation 121, A concave 125 is formed in the table 111 at the frontward position. The concave 125 extends continuously along the length direction of the table 111, and is formed by recessing downward the surface of the table 111 in a predetermined dimension. A saber or jig receiver 126 is arranged in the concave 125 throughout the length. The saber receiver 126 is formed with a so-called V-slot 127 obtained by recessing downward the surface of the table 111.

A plurality of (five, in this embodiment) locate pins 131 is arranged on the table 111 at a position backward of the accommodation 121 to correspond to the mounting pieces 81 of the airbag 1. The locate pins 131 are controlled by the control means to protrude and withdraw from the mounting face 110 of the table 111.

The folding system 101 further comprises a plurality of (two, in this embodiment) folding block sets A, B, each comprising a pressing block 152, a first arm folding means 251, and a second arm folding means 253.

Specifically, the pressing block 252 having locate-pin accommodations 252*a* (see, e.g. FIG. 49) corresponding to the locate pins 131 is vertically movably arranged on the main-body box 102 at a position backward of the table 111.

The first arm folding means 251 is arranged on the main-body box 102 at a position backward of the table 111. The first arm folding means 251 comprises a drive means for carrying out movement thereof. Specifically, the first arm folding means 251 is disposed opposite to the mounting face 110 of the table 111, and is moved in the vertical direction and in the width or cross direction of the table 111 as indicated by arrows z1 in FIG. 49 under control of the control means. The two first arm folding means 251 are applied to the front and rear expansion compartments of the airbag 1, respectively.

The second arm folding means 253 is arranged below the mounting face 110 of the table 111. The second arm folding means 253 is moved in the width or cross direction of the table 111 as indicated by arrows z1 in FIG. 49 under control of the control means.

Figure 49:
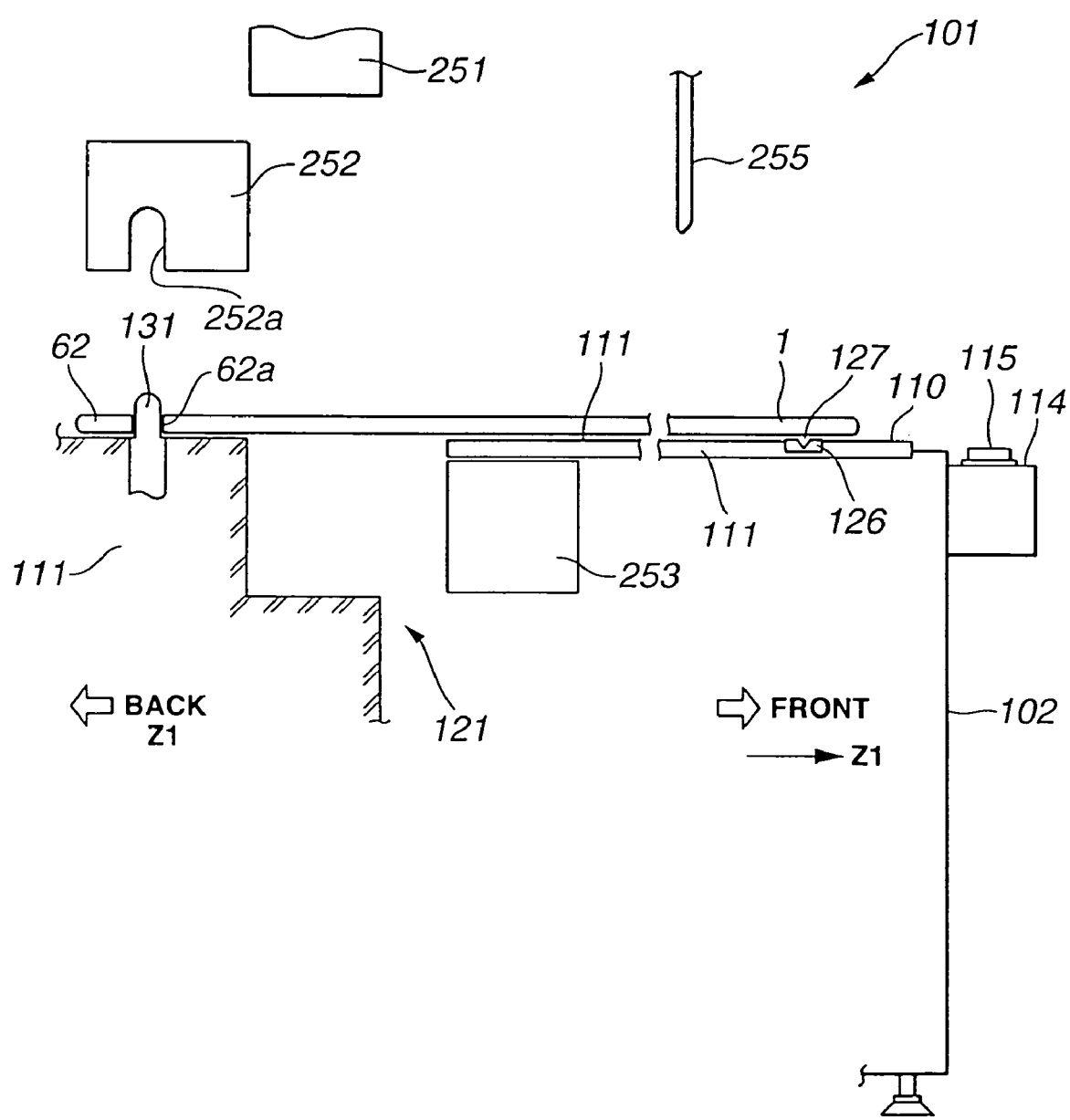

Referring to FIG. 49, an insertion plate 255 having a tapered front end is withdrawably and vertically movably arranged above the table 111.

The saber 161 is the same in structure and operation as that described in the third embodiment, so that the description thereof is omitted.

Referring next to FIGS. 47–53, the folding process of the airbag 1 or operation of the folding system 101 is described. Note that the description is made about operation in one of the folding block sets A, B, which is the same in another folding set as well.

Generally, the folding process comprises a step of spreading and placing the airbag 1 flat; a step of providing instantaneous high-speed air blow to part of an edge of the airbag 1 including expansion part 27 communicating with the gas inlet 28 so as to separate the cloths from each other; a step of compressing and aggregating the part of the edge to form a plurality of (two, in this embodiment) arms 68; a step of forming an aggregative part 86 by aggregating the rest of the airbag 1 excluding the arms; and a step of locating the aggregative part 86 between the two arms 68.

Air blow is carried out by using an air nozzle 154 as shown in FIG. 48, wherein an engagement 154*a* is set to the jig receiver 123 of the main-body box 102, and a blow pipe 154*b* is inserted into the airbag 1.

Referring to FIG. 49, in the initial state, the locate pin 131 is inserted through the through hole 62*a* of the mounting piece 62 to fix the upper portion of the airbag 1 by the pressing block 252.

Figure 50:
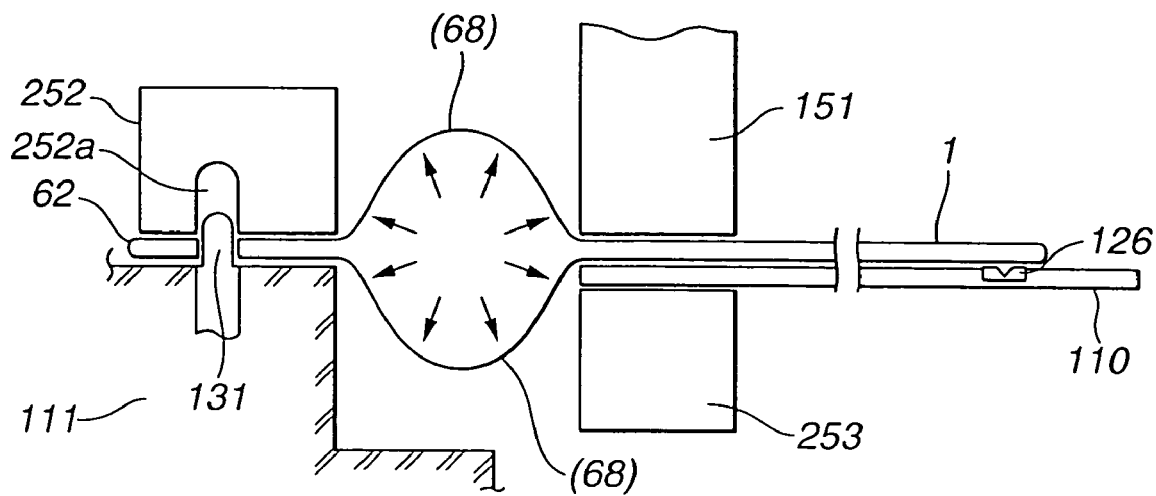

Referring to FIG. 50, in a subsequent step, the first arm folding means 251 is moved downward to face the second arm folding means 253. While air blow is provided by the air nozzle 154 to separate the cloth portions destined for the arms 68, the table 111 and the first arm folding means 251 serve to restrain downward expansion of the airbag 1. Specifically, the first arm folding means 251 restrains separation of the cloths caused by air blow without holding the airbag 1 between the first arm folding means 251 and the table 111, controlling separation of the cloths other than the upper portions destined for the arms 68.

Figure 51:
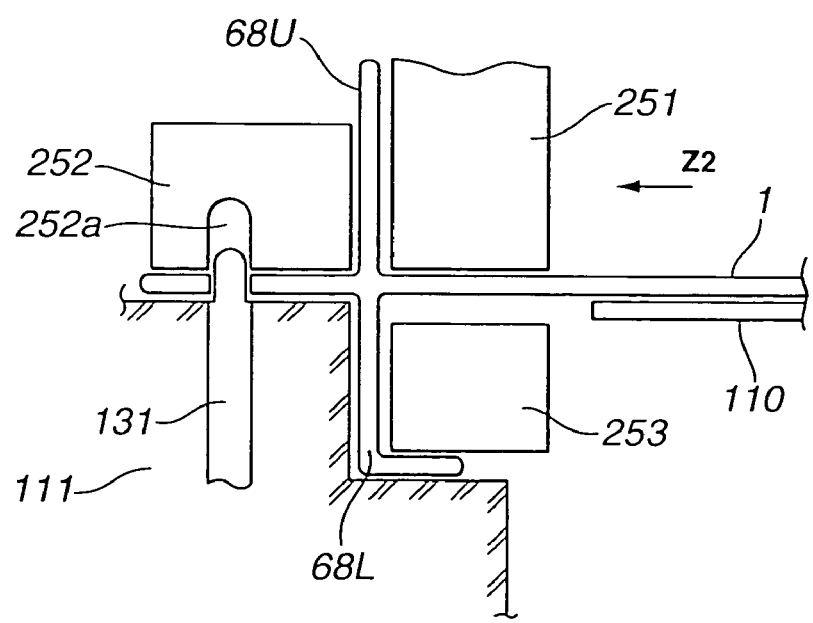

Referring to FIG. 51, in a subsequent step, the operation means 115 is actuated to move the first and second arm folding means 251, 253 backward or in the direction of arrow z2, forming the arms 68 of the airbag 1. The arms 68 include an upper arm 68U and a lower arm 68L.

Moreover, the saber 161 is mounted to the airbag 1 along the frontward edge. Specifically, the airbag 1 is caught by the base plates 164 of the saber main bodies 162, and both ends of the saber main bodies 162 are press fitted into the engagements 167 of the saber stops 163 to maintain the caught state. And the saber 161 is disposed on the saber receiver 126.

Figure 52:
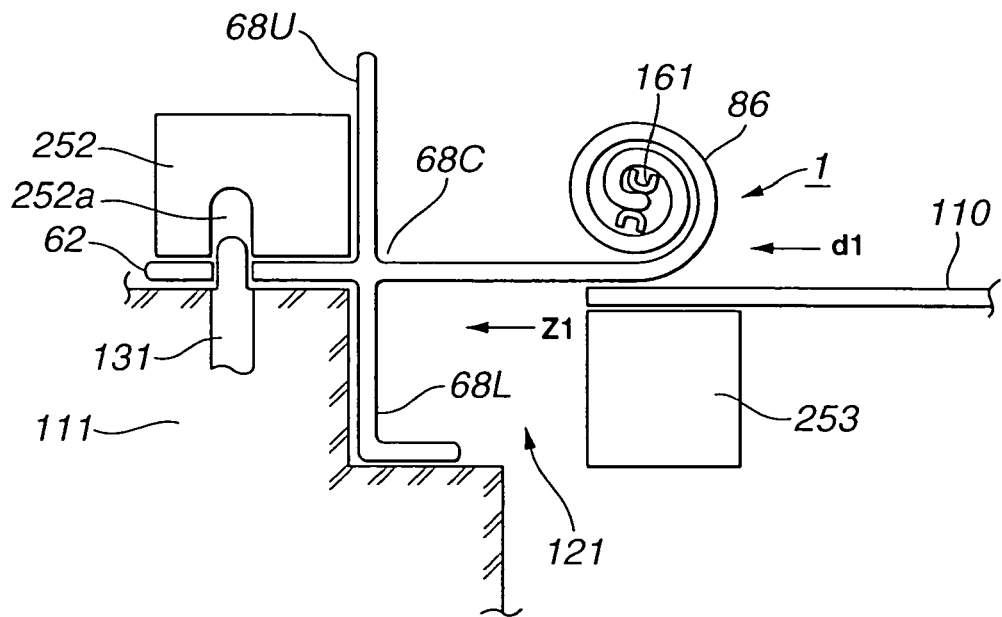

Referring to FIG. 52, in a subsequent step, the operation means 115 is actuated to move upward and withdraw the first arm folding means 251 and move the second arm folding means 253 in the direction of arrow z1, aggregating the airbag portions extending from bases 680 of the arms 68U, 68L are automatically or manually, thus forming the aggregative part 86.

In this step, the airbag 1 is rolled on the mounting face 110 backward as indicated by arrow d1 in a winding way with the saber 161 as axis, forming the rolled aggregative part 86. Winding operation is carried out manually in this embodiment. Alternatively, it can be carried out electrically using a motor and the like.

Figure 53:
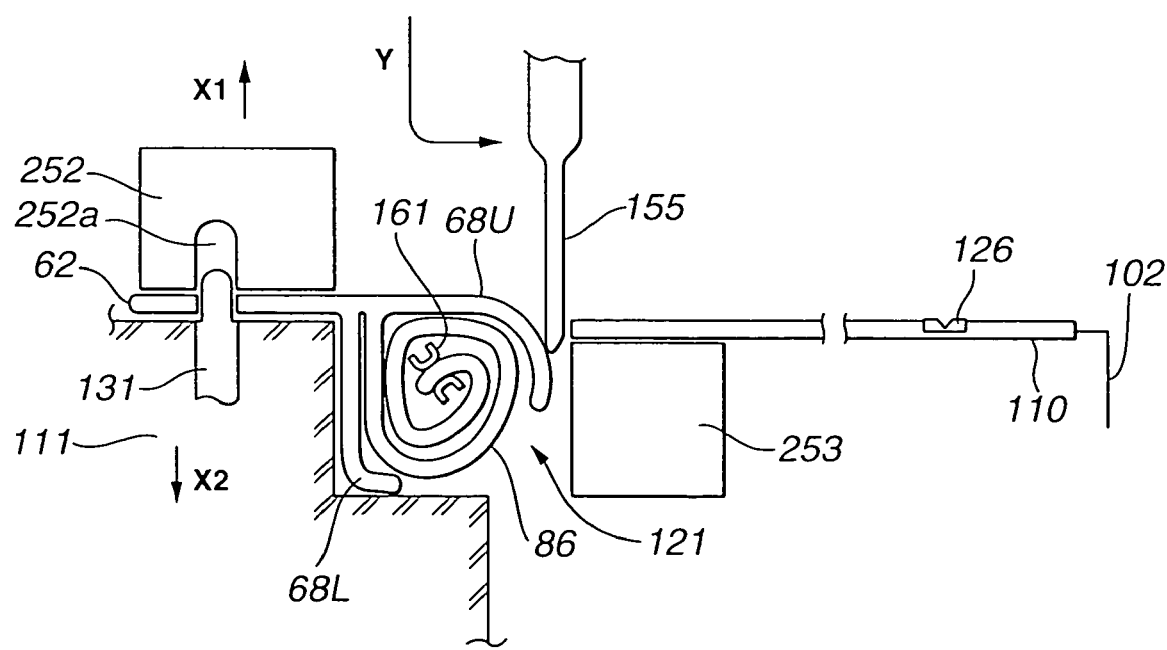

Referring to FIG. 53, in a subsequent step, the aggregative part 86 is dropped into the accommodation 121. The accommodation 121 allows restraint of the outline or preservation of the shape with the lower arm 68L adjacent to the lower or one side of the aggregative part 86. Then, the insertion plate 155 is moved as indicated by arrow Y automatically (by the use of a motor, a pneumatic cylinder or the like) or manually to push the upper arm 68U in the accommodation 121 so as to extend along the aggregative part 86.

Then, the saber stop 163 is disengaged from one end of the saber 161 to remove the saber 161 from another end along the length direction. Then, the operation means 115 is actuated to move the pressing block 252 upward as indicated by arrow x1, releasing restraint of the airbag 1 by the pressing block 252.

The shape of the airbag 1 is put in order manually to extend along the accommodation 121 as required.

In a subsequent step, the operation means 115 is actuated to move the locate pin 131 downward as indicated by arrow x2. Then, the sleeve 90 is put on the airbag 1 as shown in FIG. 47 to preserve the folding shape and prevent loosening. The mounting piece 62 is pulled out through the slit 90*a*. Note that subsequent steps may be the same as those described with reference to FIGS. 30–31 and 40–45.

Having described the present invention with regard to the illustrative embodiments, it is noted that the present invention is not limited thereto, and various changes and modifications can be made without departing form the scope of the present invention.

The entire teachings of Japanese Patent Application P2001-359739 filed Nov. 26, 2001, Japanese Patent Application P2001-376064 filed Dec. 10, 2001, and Japanese Patent Application P2002-062478 filed Mar. 7, 2002 are hereby incorporated by reference.

What is claimed is:

1. A curtain airbag, comprising:
    a duct part, the duct part having an inlet for allowing fluid communication throughout the duct part;
    an aggregative part communicating with the duct part, the aggregative part being obtained by aggregating a downward portion of the airbag; and
    a plurality of arms included in the duct part, respectively, the arms being obtained by folding an upward portion of the airbag, the arms being in fluid communication along a length direction of the airbag, the arms covering the aggregative part on a back thereof along an expansion direction of the airbag.

2. The curtain airbag as claimed in claim 1, wherein the duct part is formed like a cylinder at an intermediate step in a folding process.

3. The curtain airbag as claimed in claim 1, wherein the aggregative part is sandwiched between the plurality of arms in a cross direction of a vehicle.

4. The curtain airbag as claimed in claim 1, wherein the aggregative part is formed like a roll.

5. The curtain airbag as claimed in claim 1, wherein the arms cover the aggregative part on a top thereof with respect to the expansion direction of the airbag and do not cover a majority of a bottom of the aggregative part with respect to the expansion direction of the airbag.

6. A curtain airbag, comprising:
    a duct part, the duct part having an inlet for allowing fluid communication throughout the duct part;
    a passage, which is formed substantially at a center of the duct part, the passage having an end communicating with the inlet, the passage allowing fluid communication between one end of the duct part and another end thereof;
    a plurality of arms, included in the duct part, the arms communicating with the passage along a length direction of the passage, the arms extending radially from the passage; and
    an aggregative part, the aggregative part being folded in communication with the duct part and along a length direction of the duct part,
    wherein the arms cover the aggregative part on a back thereof along an expansion direction of the airbag.

7. The curtain airbag as claimed in claim 6, wherein the duct part is formed like a cylinder at an intermediate step in a folding process.

8. The curtain airbag as claimed in claim 6, wherein the plurality of arms partly surrounds the aggregative part.

9. The curtain airbag as claimed in claim 6, wherein the aggregative part is located below the passage.

10. The curtain airbag as claimed in claim 6, wherein the aggregative part is formed like a roll.

11. The curtain airbag as claimed in claim 6, wherein the arms cover the aggregative part on a top thereof with respect to the expansion direction of the airbag and do not cover a majority of a bottom of the aggregative part with respect to the expansion direction of the airbag.

* * * * *